(12) United States Patent
Yamasaki et al.

(10) Patent No.: US 8,797,834 B2
(45) Date of Patent: Aug. 5, 2014

(54) OBJECTIVE LENS, OPTICAL HEAD, OPTICAL DISK DEVICE, AND INFORMATION PROCESSING DEVICE

(75) Inventors: Fumitomo Yamasaki, Nara (JP); Hiroshi Shiroiwa, Osaka (JP); Yoshiaki Komma, Osaka (JP); Junichi Asada, Hyogo (JP); Osamu Kajino, Osaka (JP); Noriaki Terahara, Osaka (JP); Toshiyasu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 10 days.

(21) Appl. No.: 13/699,134

(22) PCT Filed: May 31, 2011

(86) PCT No.: PCT/JP2011/003035
§ 371 (c)(1),
(2), (4) Date: Nov. 20, 2012

(87) PCT Pub. No.: WO2011/161879
PCT Pub. Date: Dec. 29, 2011

(65) Prior Publication Data
US 2013/0064057 A1 Mar. 14, 2013

(30) Foreign Application Priority Data
Jun. 21, 2010 (JP) .................................. 2010-140092

(51) Int. Cl.
*G11B 7/135* (2012.01)
(52) U.S. Cl.
USPC .................................................... 369/112.23
(58) Field of Classification Search
None
See application file for complete search history.

(56) References Cited

U.S. PATENT DOCUMENTS

| | | | | |
|---|---|---|---|---|
| 5,384,659 | A * | 1/1995 | Shikama et al. | 359/719 |
| 6,388,822 | B1 * | 5/2002 | Kitamura et al. | 359/793 |
| 6,760,294 | B2 * | 7/2004 | Miyake | 369/112.01 |
| 6,813,096 | B2 * | 11/2004 | Ohta | 359/719 |
| 7,110,342 | B2 * | 9/2006 | Nishino et al. | 369/112.01 |
| 7,330,419 | B2 | 2/2008 | Nishino et al. | |
| 7,480,227 | B2 | 1/2009 | Nishino et al. | |

(Continued)

FOREIGN PATENT DOCUMENTS

| | | |
|---|---|---|
| JP | 2004-145906 | 5/2004 |
| JP | 2005-18967 | 1/2005 |

(Continued)

OTHER PUBLICATIONS

International Search Report issued Aug. 2, 2011 in International (PCT) Application No. PCT/JP2011/003035.

*Primary Examiner* — Peter Vincent Agustin
(74) *Attorney, Agent, or Firm* — Wenderoth, Lind Ponack, L.L.P.

(57) ABSTRACT

A disclosed objective lens includes: a lens having an entrance surface and an emission surface; and an anti-reflection coat formed on the emission surface, wherein a transmittance $T1\_0$ [%] of the anti-reflection coat when an incident angle of a first laser beam having a first wavelength $\lambda 1$ (390 nm≤$\lambda 1$≤430 nm) is 0°, and the transmittance $T1\_40$ [%] of the anti-reflection coat when the incident angle of the first laser beam is 40° satisfy $0.95 \leq T1\_0/T1\_40 \leq 1.05$, and a transmittance $T2\_0$ [%] of the anti-reflection coat when an incident angle of a second laser beam having a second wavelength $\lambda 2$ (630 nm≤$\lambda 2$≤680 nm) is 0° and a transmittance $T2\_40$ [%] of the anti-reflection coat when the incident angle of the second laser beam is 40° satisfy $0.85 \leq T2\_0/T2\_40 \leq 0.97$.

13 Claims, 15 Drawing Sheets

(56) References Cited

U.S. PATENT DOCUMENTS

| | | |
|---|---|---|
| 2001/0012258 A1* | 8/2001 | Kishima et al. .......... 369/112.23 |
| 2003/0095492 A1 | 5/2003 | Nishino et al. |
| 2003/0169670 A1* | 9/2003 | Hirayama ................ 369/112.23 |
| 2004/0246873 A1 | 12/2004 | Maruyama et al. |
| 2004/0264354 A1* | 12/2004 | Hirayama ................ 369/112.23 |
| 2005/0007934 A1* | 1/2005 | Ohta et al. ............... 369/112.23 |
| 2005/0018297 A1 | 1/2005 | Ohta et al. |
| 2005/0265150 A1* | 12/2005 | Hirayama et al. ......... 369/44.37 |
| 2006/0215505 A1 | 9/2006 | Nishino et al. |
| 2006/0233071 A1 | 10/2006 | Nishino et al. |
| 2007/0070859 A1* | 3/2007 | Hirayama ................ 369/112.04 |
| 2008/0285422 A1 | 11/2008 | Taka |
| 2009/0059769 A1* | 3/2009 | Taka ....................... 369/112.23 |
| 2013/0064057 A1* | 3/2013 | Yamasaki et al. .......... 369/44.11 |

FOREIGN PATENT DOCUMENTS

| | | |
|---|---|---|
| JP | 2005-116147 | 4/2005 |
| JP | 2005-129227 | 5/2005 |
| JP | 2006-227596 | 8/2006 |
| JP | 2008-282507 | 11/2008 |

* cited by examiner

| LAYER | MATERIAL | REFRACTIVE INDEX | THICKNESS |
|---|---|---|---|
| AIR | | 1.0 | |
| 6 | $SiO_2$ | 1.43 | 53 |
| 5 | $Ta_2O_5$ | 2.10 | 165 |
| 4 | $SiO_2$ | 1.43 | 128 |
| 3 | $Ta_2O_5$ | 2.10 | 170 |
| 2 | $SiO_2$ | 1.43 | 10 |
| 1 | $Ta_2O_5$ | 2.10 | 17 |
| BASE MATERIAL | OPTICAL RESIN MATERIAL | 1.50 | |

| LAYER | MATERIAL | REFRACTIVE INDEX | THICKNESS |
|---|---|---|---|
| AIR | | 1.0 | |
| 4 | $SiO_2$ | 1.43 | 235 |
| 3 | $Ta_2O_5$ | 2.10 | 38 |
| 2 | $SiO_2$ | 1.43 | 20 |
| 1 | $Ta_2O_5$ | 2.10 | 130 |
| BASE MATERIAL | OPTICAL RESIN MATERIAL | 1.50 | |

OBJECTIVE LENS, OPTICAL HEAD, OPTICAL DISK DEVICE, AND INFORMATION PROCESSING DEVICE

TECHNICAL FIELD

The present invention relates to an objective lens for converging laser beams emitted from the laser power supply onto information recording surfaces of a plurality of types of information recording media such as optical disks, to an optical head which is provided with the objective lens and optically records or reproduces information on or from information recording media, to an optical disk device provided with the optical head, and to an information processing device provided with the optical disk device.

BACKGROUND ART

As a blue-violet semiconductor laser has been put into practical use, a Blu-ray disc (hereafter BD)—an optical information recording medium (hereafter optical disk)—having high density and large capacity as well as the same size as a CD (Compact Disc) and the DVD (Digital Versatile Disc), has been commercialized. BD is an optical disk for recording or reproducing information on or from an information recording surface of which thickness of the light transmission layer is approximately 0.1 mm, using a blue-violet laser source which emits a laser beam having approximately a 400 nm wavelength, and an objective lens of which numerical aperture (NA) is approximately 0.85.

An objective lens made from synthetic resin is normally used for an optical head for recording or reproducing information on or from such an optical disk as a CD or a DVD. Compared with a glass objective lens, the specific gravity of a synthetic resin objective lens is smaller. Therefore if a synthetic resin objective lens is used, burden on an objective lens actuator, which drives an objective lens with respect to axial run-out and decentering of an optical disk, can be decreased, and the objective lens can follow up the axial run-out and decentering of the optical disk at high-speed. Furthermore, a synthetic resin objective lens can be mass produced at high precision by injection molding, therefore cost of the objective lens can be decreased.

Hence a synthetic resin objective lens is often used even for a high NA objective lens that is used for a BD optical head.

Many types of so-called compatible objective lenses are also known, where a diffraction structure is formed on the synthetic resin objective lens whereby spherical aberration, generated by the difference of thickness of the light transmission layer among a plurality of types of optical disks, is corrected using the difference of the light source wavelength.

For example, Patent Literature 1 discloses an objective lens, which generates a function of a convex lens by diffracting the blue-violet laser beam having the wavelength $\lambda 1$, so as to implement convergence on the information recording surface of the BD of which thickness of the light transmission layer is approximately 0.1 mm, and which generates a function of a concave lens by diffracting the red laser beam having the wavelength $\lambda 2$, so as to implement convergence on the information recording surface of the DVD of which thickness of the light transmission layer is approximately 0.6 mm.

FIG. 19 is a diagram depicting a configuration of a conventional objective lens. The left drawing in FIG. 19 is a schematic plan view depicting a configuration of a conventional objective lens 90, and the right drawing in FIG. 19 is a schematic cross-sectional view depicting the configuration of the conventional objective lens 90. A zonal diffraction structure (hologram) is formed on the entrance surface 91 on the light source side (side where laser beam enters) of the objective lens 90, centering around the optical axis OA of the objective lens 90. The diffraction structure is different between the inner circumference area 911 including the optical axis OA and the outer circumference area 912 which is a peripheral area of the inner circumference area 911.

The inner circumference area 911 is a compatible area which is used for recording or reproducing the DVD using a red laser beam, and recording or reproducing the BD using a blue-violet laser beam, and is designed such that plus first-order diffracted light of the blue-violet laser beam is converged on the information recording surface of the BD and minus first-order diffracted light of the red laser beam is converged on the information recording surface of the DVD.

On the other hand, the NA upon recording or reproducing information on or from the BD using the blue-violet laser beam (approximately 0.85) is greater than the NA upon recording or reproducing information on or from the DVD using a red laser beam (approximately 0.60). Therefore it is designed such that the outer circumference area 912 is an area dedicated to the BD, and only the blue-violet laser beam is converged on the information recording surface of the BD, and the red laser beam generates an aberration on the information recording surface of the DVD.

One unit of the step difference of the diffraction structure of the inner circumference area 911 is an amount to generate approximately a $1.25 \times \lambda 1$ [nm] of optical path difference for the blue-violet laser beam having the wavelength $\lambda 1$ ($\lambda 1=405$ nm), and the phase modulation amount is $\pi/2$ per step. In this case, the diffraction efficiency of the plus first-order diffracted light is approximately 80% based on the scalar calculation, which is highest among the orders of diffraction.

One unit of the step difference of the diffraction structure in the inner circumference area 911 is an amount to generate approximately a $0.75 \times \lambda 2$ [nm] of optical path difference for the red laser beam having the wavelength $\lambda 2$ ($\lambda 2=660$ nm), and the phase modulation quantity $-\pi/2$ per step. In this case, the diffraction efficiency of the minus first-order diffracted light is approximately 80% based on the scalar calculation, which is highest among the orders of diffraction.

If the inner circumference area 911 has this diffraction structure, a compatible recording or compatible reproduction of information can be implemented at high light utilization efficiency for the DVD having a 0.6 mm thick light transmission layer, and for the BD having approximately a 0.1 mm thick light transmission layer.

If a lens having a diffraction structure, which is not limited to a compatible objective lens, is used, the diffraction efficiency may change depending on the radius position of the lens. This is because the pitch of the diffraction structure in the effective diameter of the lens is different depending on the radius position. Generally if the lens power is generated by the diffraction structure, the pitch of the diffraction structure decreases and diffraction efficiency decreases as the radius position approaches from the inner circumference near the optical axis to the outer circumference.

The intensity distribution of the semiconductor laser used for the optical head for the optical disk, on the other hand, decreases Gaussian-functionally as the distance from the optical axis increases, hence the intensity of the laser beam is lower in the outer circumference than in the inner circumference. If the intensity of the laser beam, which enters the objective lens, decreases dramatically in the outer circumference, the effective NA of the objective lens decreases. As a result, the focal spot on the information recording surface of the optical disk cannot be sufficiently focused.

With the foregoing in view, Patent Literature 2, for example, discloses a configuration of an optical head that uses an objective lens having a diffraction structure, wherein a light distribution correction element for decreasing a predetermined amount of transmittance in an area near the optical axis is disposed in order to correct a drop in the intensity of a laser beam that enters the objective lens, generated along with the increase in the distance from the optical axis, and to suppress the deterioration of focal spots on an information recording surface of the optical disk.

Furthermore according to the conventional objective lens disclosed in Patent Literature 1, for example, the inner circumference area is used for recording or reproduction for both the DVD and the BD. Therefore the pitch of the diffraction structure becomes small in the area near the outermost circumference of the inner circumference area, and there may be a case where diffraction efficiency drops.

FIG. 20 is a graph depicting a diffraction efficiency of the conventional objective lens. In FIG. 20, in the conventional objective lens 90 disclosed in Patent Literature 1, the diffraction efficiency of the blue-violet laser beam having the wavelength λ1 and that of the red laser beam having the wavelength λ2 are calculated based on the wave calculation (vector calculation). In FIG. 20, the abscissa is the entrance position of the laser beam, that is the distance from the optical axis OA (radius of objective lens), and the ordinate is the diffraction efficiency corresponding to the entrance position.

As FIG. 20 shows, in the case of the wavelength λ2, the diffraction efficiency is 70% or more in a position near the optical axis in the inner circumference area (point α), whereas the diffraction efficiency drops to 50% or less in a position near the outermost circumference of the inner circumference area (point β). This is because the pitch of the diffraction structure is smaller in the position of the point β than the position of the point α, and in addition, the inclination angle of the entrance surface 91 increases and the incidence angle of the laser beam which enters the objective lens 90 in parallel increases as the distance from the optical axis OA increases. The diffraction efficiency in the position of the point β can further drop by the dispersion in molding, for example.

If the intensity of the laser beam which enters the objective lens drops dramatically in the outer circumference, as mentioned above, the focal spot on the information recording surface of the optical disk cannot be sufficiently focused, but this problem of the conventional compatible objective lens is not mentioned in Patent Literature 1.

Further, Patent Literature 2 discloses a configuration to dispose the light distribution correction element for decreasing a predetermined amount of transmittance in an area near the optical axis, in order to suppress the deterioration of focal spots on the information recording surface of an optical disk, but here an optimum configuration of the above mentioned compatible objective lens is neither disclosed nor suggested.

CITATION LIST

Patent Literature

Patent Literature 1: Japanese Patent Application Laid-Open No. 2005-129227
Patent Literature 2: Japanese Patent Application Laid-Open No. 2004-145906

SUMMARY OF THE INVENTION

With the foregoing in view, it is an object of the present invention to solve the abovementioned problems and provide an objective lens, an optical head, an optical disk device and an information processing device which can suppress deterioration of a focal spot caused by a drop in diffraction efficiency.

An objective lens according to an aspect of the present invention is an objective lens made from synthetic material, that converges a laser beam emitted from a laser light source onto an information recording surface of an information recording medium, comprising: a lens having a first surface facing the laser light source and a second surface facing the information recording medium; and an anti-reflection coat formed on the second surface, wherein the lens converges a first laser beam having a first wavelength λ1 (390 nm≤λ1≤430 nm) that transmits through an area, of which radius from an optical axis of the objective lens is R1, of the first surface, onto an information recording surface of a first information recording medium, and converges a second laser beam having a second wavelength λ2 (630 nm≤λ2≤680 nm) that transmits through an area, of which radius from the optical axis of the objective lens is R2 (R2<R1), of the first surface, onto an information recording surface of a second information recording medium that is different from the first information recording medium, a transmittance T1_0 [%] of the anti-reflection coat when an incident angle of the first laser beam is 0° and a transmittance T1_40 [%] of the anti-reflection coat when the incident angle of the first laser beam is 40° satisfy 0.95≤T1_0/T1_40≤1.05, and a transmittance T2_0 [%] of the anti-reflection coat when an incident angle of the second laser beam is 0° and a transmittance T2_40 [%] of the anti-reflection coat when the incident angle of the second laser beam is 40° satisfy 0.85≤T2_0/T2_40≤0.97.

According to this configuration, an objective lens made from synthetic resin that converges a laser beam emitted from a laser light source onto an information recording surface of an information recording medium comprises a lens having a first surface facing the laser light source and a second surface facing the information recording medium, and an anti-reflection coat formed on the second surface. The lens converges a first laser beam having a first wavelength λ1 (390 nm≤λ1≤430 nm) that transmits through an area, of which radius from an optical axis of the objective lens is R1, of the first surface, onto an information recording surface of a first information medium. The lens also converges a second laser beam having a second wavelength λ2 (630 nm≤λ2≤680 nm) that transmits through an area, of which radius from the optical axis of the objective lens is R2 (R2<R1), of the first surface, onto an information recording surface of a second information recording medium which is different from the first information recording medium. A transmittance T1_0 [%] of the anti-reflection coat when an incident angle of the first laser beam is 0° and a transmittance T1_40 [%] of the anti-reflection coat when the incident angle of the first laser beam is 40° satisfy 0.95≤T1_0/T1_40≤1.05, and a transmittance T2_0 [%] of the anti-reflection coat when an incident angle of the second laser beam is 0° and a transmittance T2_40 [%] of the antireflection when the incident angle of the second laser beam is 40° satisfy 0.85≤T2_0/T2_40≤0.97.

According to this invention, the transmittance of the second laser beam in an area near the optical axis is dropped by the anti-reflection coat formed on the second surface of the objective lens, whereby a drop in the intensity of the second laser beam, along with the increase in the distance from the optical axis, can be corrected, and deterioration of focal spots caused by a drop in the diffraction efficiency can be suppressed.

DESCRIPTION OF EMBODIMENTS

Embodiments of the present invention will now be described with reference to the drawings. The following embodiments are examples to carry out the invention, and are not for limiting the technical scope of the present invention.

Embodiment 1

Figure 1:
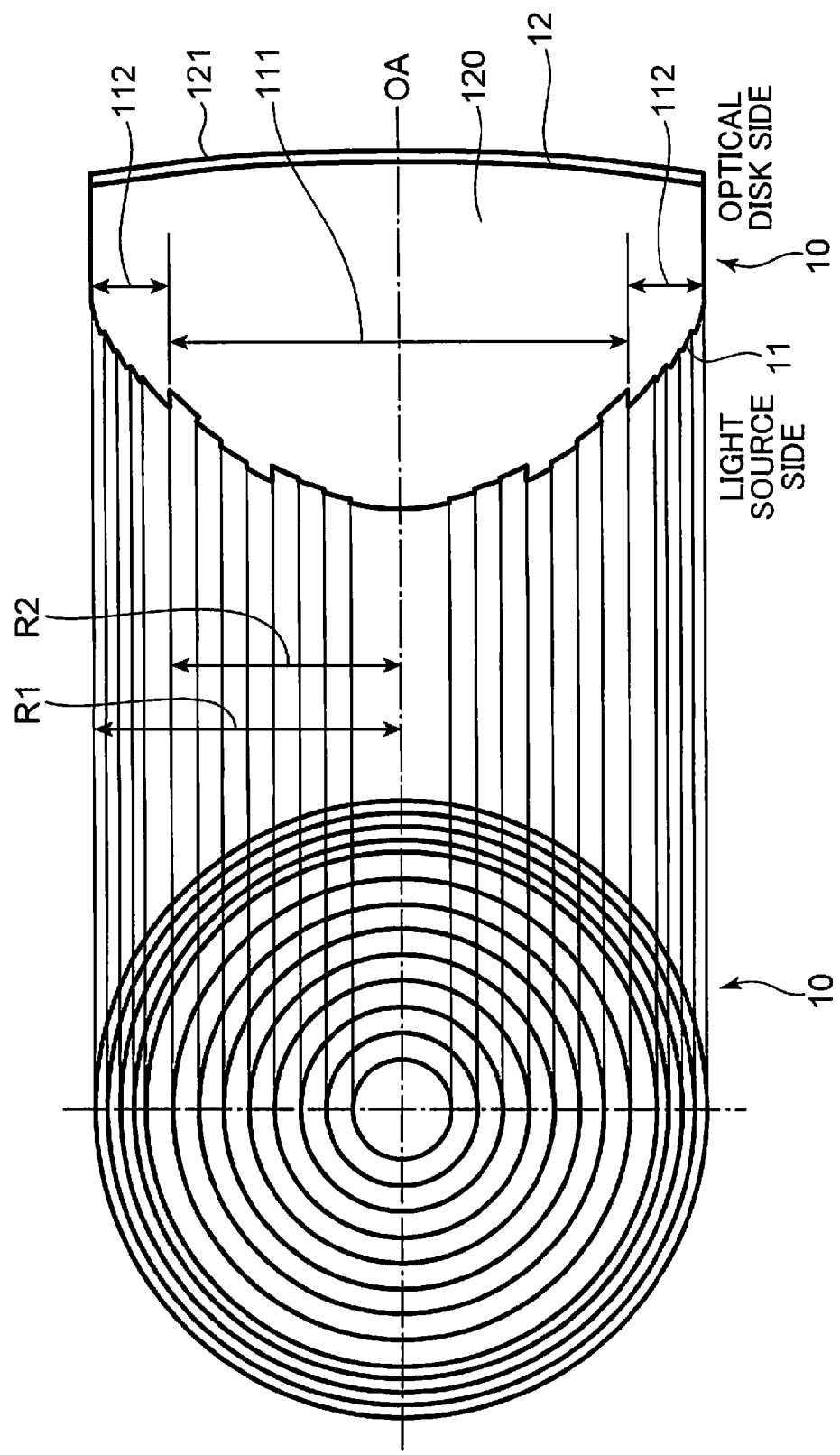
FIG. 1 is a diagram depicting a configuration of an objective lens according to Embodiment 1 of the present invention.

FIG. 1 is a diagram depicting a configuration of an objective lens according to Embodiment 1 of the present invention. The left drawing in FIG. 1 is a schematic plan view depicting a configuration of a synthetic resin objective lens 10 of Embodiment 1, and the right drawing in FIG. 1 is a schematic cross-sectional view depicting the configuration of the objective lens 10 of Embodiment 1.

The objective lens 10 of Embodiment 1 is used as a compatible objective lens which can support both the BD for recording or reproducing information using a blue-violet laser beam having a wavelength $\lambda 1$, and the DVD for recording or reproducing information using a red laser beam having the wavelength $\lambda 2$ which is longer than the wavelength $\lambda 1$.

The objective lens 10 has a spherical surface or an aspherical surface to be a base on an entrance surface 11 on the light source side (side where the laser beam enters). On the spherical surface or the aspherical surface to be a base (hereafter generically called "base aspherical surface"), a zonal diffraction structure is formed with the optical axis OA of the objective lens 10 as the center. An emission surface 12 on the optical disk side (side where the laser beam is emitted), which faces the entrance surface 11, is a spherical surface or an aspherical surface.

The objective lens 10 is an objective lens made from synthetic resin, that converges a laser beam emitted from the laser light source onto an information recording surface of an information recording medium. The objective lens 10 comprises a lens 120 having an entrance surface 11 (first surface) facing the laser light source and an emission surface 12 (second surface) facing the information recording medium, and an anti-reflection coat 121 formed on the emission surface 12.

The diffraction structure formed on the entrance surface 11 in an inner circumference area 111, including an optical axis OA, is different from that in an outer circumference area 112 that is around the inner circumference area 111.

The inner circumference area 111 has a diffraction structure which has a step profile of which one cycle is four steps, and is a compatible area which can be used for both recording or reproducing the DVD using the red laser beam having the wavelength $\lambda 2$, and recording or reproducing the BD using the blue-violet laser beam having the wavelength $\lambda 1$. The inner circumference area 111 is designed to converge a plus first-order diffracted light of the blue-violet laser beam on the information recording surface of the BD via the light transmission layer with approximately a 0.1 mm thickness, and converge a minus first-order diffracted light of the red laser beam on the information recording surface of the DVD via the light transmission layer with approximately a 0.6 mm thickness. The inner circumference area 111 is an area corresponding to an NA smaller than the NA of the DVD (approximately 0.60 to 0.65).

The NA used when information is recorded on or reproduced from the BD using the blue-violet laser beam (approximately 0.85) is greater than the NA used when information is recorded on or reproduced from the DVD using the red laser beam (approximately 0.60 to 0.65). Therefore the outer circumference area 112 is designed to be a dedicated area for the BD and to converge only the blue-violet laser beam having the wavelength $\lambda 1$ on the information recording surface of the BD. The outer circumference area 112 is designed so that an aberration is generated in the red laser beam having the wavelength $\lambda 2$, that is, the focal point of the focal spot of the red laser beam shifts considerably, on the information recording surface of the DVD. More specifically, the red laser beam that has transmitted the outer circumference area 112 exhibits an aberration on the recording surface of the DVD. Therefore the outer circumference area 112 substantially functions as an aperture stop upon recording or reproducing the DVD.

The lens 120 converges a first laser beam having a first wavelength $\lambda 1$ (390 nm$\leq \lambda 1 \leq$430 nm) that transmits through an area, of which radius from an optical axis OA of the objective lens 10 is R1, of the entrance surface 11, onto an information recording surface of a BD. The lens 120 also converges a second laser beam having a second wavelength 22 (630 nm≤λ2≤680 nm) that transmits through an area, of which radius from the optical axis OA of the objective lens is R2 (R2<R1), of the entrance surface 11, onto an information recording surface of a DVD.

One unit of the step difference of the diffraction structure of the inner circumference area 111 is an amount to generate approximately a 1.25×λ1 [nm] of optical path difference for the blue-violet laser beam having the wavelength λ1 (e.g. λ1=405 nm), and the phase modulation amount is π/2 per step. In this case, the diffraction efficiency of the plus first-order diffracted light is approximately 80% based on the scalar calculation, which is highest among the orders of diffraction.

On the other hand, one unit of the step difference of the diffraction structure of the inner circumference area 111 is an amount to generate approximately a 0.75×λ2 [nm] of optical path difference for the red laser beam having the wavelength λ2 (e.g. λ2=660 nm), and the phase modulation amount is −π/2 per step. In this case, the diffraction efficiency of the minus first-order diffracted light is approximately 80% based on the scalar calculation, which is highest among the orders of diffraction.

If the inner circumference area 111 has this diffraction structure, serrated profiles in approximately opposite directions can be generated between the wavelength λ1 and the wavelength λ2, therefore compatible recording or compatible reproduction of information can be implemented, with high light utilization efficiency, for both the DVD having the light transmission layer with approximately a 0.6 mm thickness, and the BD having the light transmission layer with approximately a 0.1 mm thickness.

Figure 2:
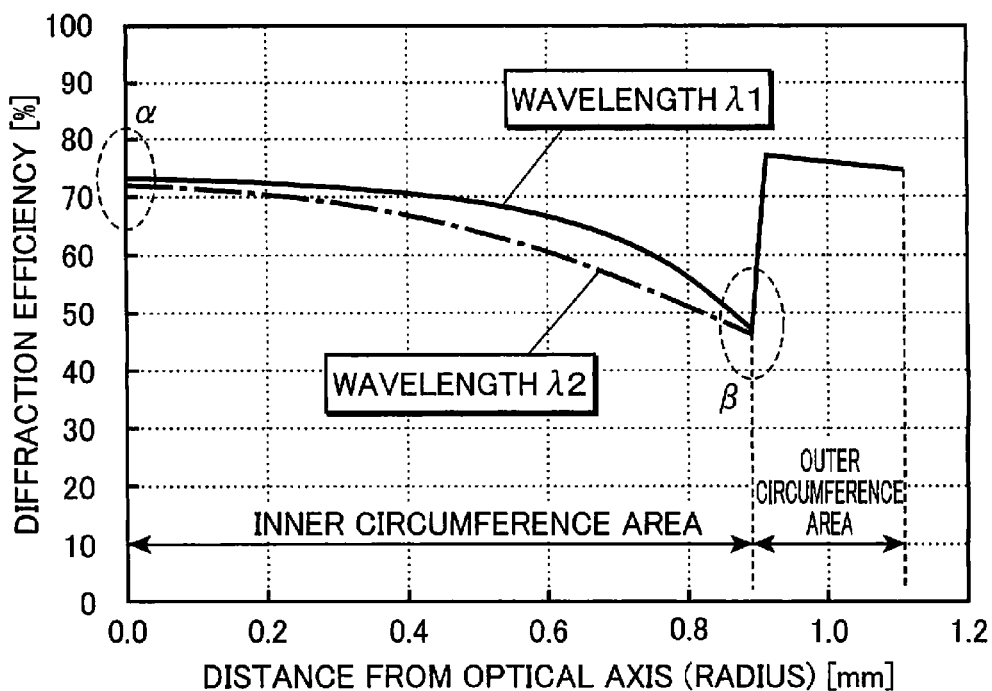
FIG. 2 is a graph depicting the diffraction efficiency of the objective lens according to Embodiment 1 of the present invention.

FIG. 2 is a graph depicting the diffraction efficiency of the objective lens according to Embodiment 1 of the present invention. In FIG. 2, in the objective lens 10 according to Embodiment 1, the diffraction efficiency of the blue-violet laser beam having the wavelength λ1 (=405 nm) and that of the red laser beam having the wavelength λ2 (=660 nm) are calculated based on the wave calculation (vector calculation). In FIG. 2, the abscissa is the entrance position of the laser beam, that is the distance from the optical axis OA (radius of objective lens), and the ordinate is the diffraction efficiency corresponding to the entrance position.

As FIG. 2 shows, in the case of the wavelength λ2, the diffraction efficiency is 70% or more in a position near the optical axis in the inner circumference area 111 (point α), whereas the diffraction efficiency is 50% or less in a position near the outermost circumference of the inner circumference area 111 (point β). This is because the pitch of the diffraction structure is smaller in the position of the point β than the position of the point α, and in addition, the inclination angle of the base aspherical surface of the entrance surface 11 increases, and the incident angle of the laser beam, which enters the objective lens 10 in parallel increases as the distance from the optical axis OA increases. The diffraction efficiency in the position of the point β may further drop due to dispersion during molding or the like.

In the case of the wavelength λ1, the diffraction efficiency is 70% or more in a position near the optical axis in the inner circumference area 111 (point α) and the diffraction efficiency is 50% or less in a position near the outermost circumference of the inner circumference area 111 (point β), meanwhile the diffraction efficiency is 70% or more in almost all the areas of the outer circumference area 112 This is because the outer circumference area 112 is a dedicated area for the BD, where a diffraction structure in a serrated profile, optimized with the wavelength λ1, is formed in the outer circumference area 112.

The objective lens 10 of Embodiment 1 is characterized in that the anti-reflection coat 121, of which transmittance changes according to the wavelength and the incident angle, is formed on the emission surface 12.

Figure 3:
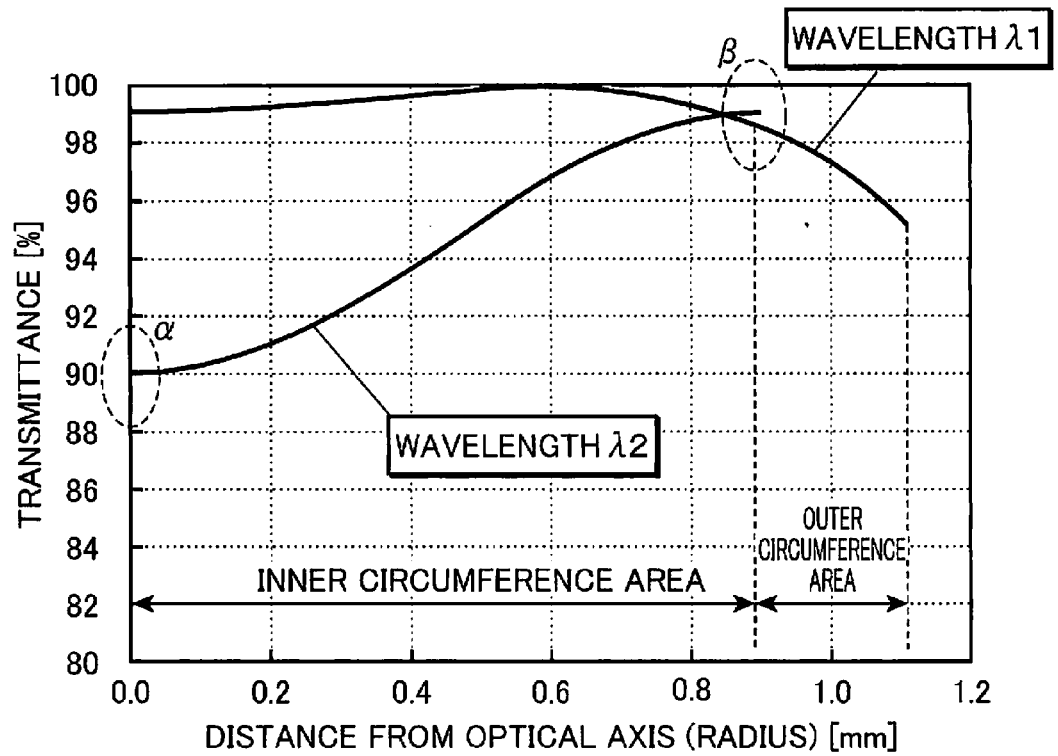
FIG. 3 is a graph depicting a transmittance of an anti-reflection coat formed on the objective lens according to Embodiment 1 of the present invention.

FIG. 3 is a graph depicting a transmittance distribution of the blue-violet laser beam of which wavelength is λ1 (=405 nm) and a red laser beam of which wavelength is λ2 (=660 nm) on the anti-reflection coat 121 formed on the objective lens 10 according to Embodiment 1 of the present invention. In FIG. 3, the abscissa is the entrance position of the laser beam, that is, the distance from the optical axis OA (radius of the objective lens), and the ordinate is the transmittance of the laser beam, transmitted through the entrance position, on the emission surface 12.

As FIG. 3 shows, at the wavelength λ2, the transmittance in an area near the optical axis (point α) in the inner circumference area 111 is approximately 90%, while the transmittance in an area near the outermost circumference (point β) in the inner circumference area 111 is at least 99%.

As described above, by the anti-reflection coat 121 formed on the emission surface 12 of the objective lens 10, the transmittance in an area near the optical axis in the inner circumference area 111 is decreased. Thereby a drop in the intensity of the laser beam along with the increase in the distance from the optical axis can be corrected, and degradation of focal spots by the red laser beam formed on the information recording surface of the DVD can be suppressed.

At wavelength λ1, on the other hand, the transmittance distribution is approximately flat with at least 98% from an area near the optical axis (point α) in the inner circumference area 111 to an area near the outermost circumference (point β) in the inner circumference area 111, and the transmittance is also at least 95% in the entire area of the outer circumference area 112.

Here for the blue-violet laser beam having the wavelength λ1 as well, it is possible to correct a drop in the intensity of the laser beam along with the increase in the distance from the optical axis by decreasing the transmittance in an area near the optical axis in the inner circumference area 111, just like the red laser beam having the wavelength λ2, as mentioned above, so that degradation of the focal spots by the blue-violet laser beam formed on the information recording surface of the BD can be suppressed.

However the inventors discovered a problem where if the transmittance of the blue-violet laser beam having the wavelength λ1 is decreased in an area near the optical axis in the inner circumference area, the synthetic resin objective lens may be damaged.

Figures 4, 5:
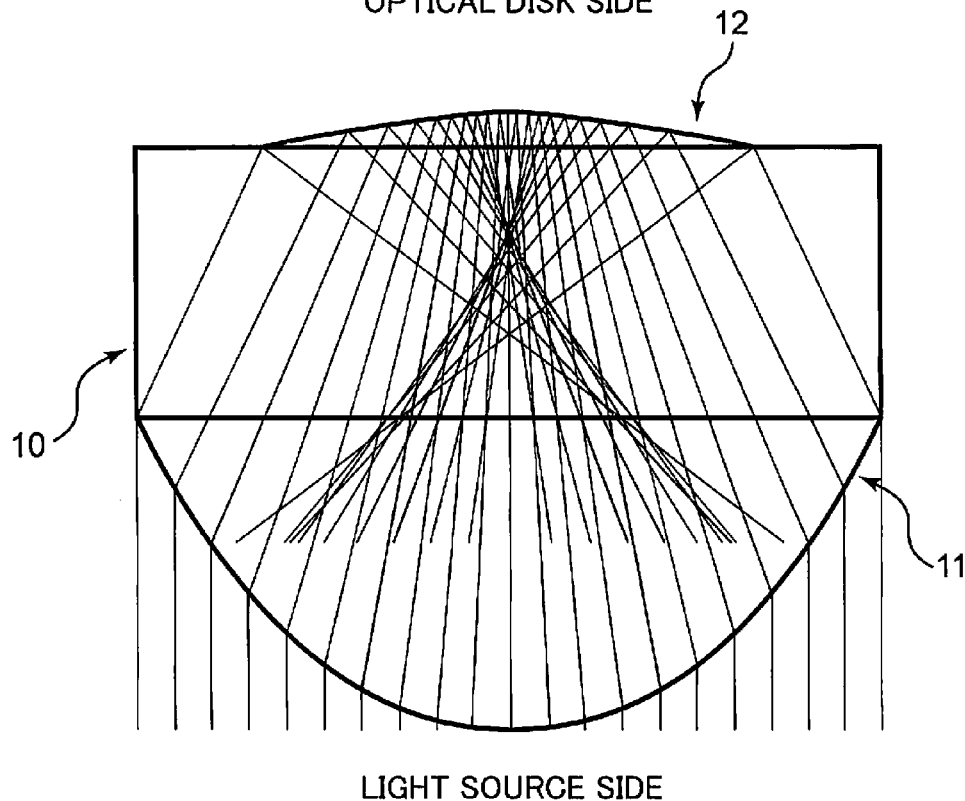
FIG. 4 is a diagram depicting a state of beams when blue-violet laser beams, which entered from the entrance surface side of the objective lens, reflect on an inner face of the emission surface.
FIG. 5 shows a film configuration of an anti-reflection coat according to Embodiment 1 of the present invention.

FIG. 4 is a diagram depicting a state of beams when blue-violet laser beams, which entered from the entrance surface 11 side of the objective lens 10, reflect on an inner face of the emission surface 12. As FIG. 4 shows, the blue-violet laser beams reflected on the inner face of the emission surface 12 are focused inside the objective lens 10.

If a blue-violet laser beam, of which wavelength is approximately 400 nm, is irradiated onto a synthetic resin optical component at high density, it is known that absorption of the blue-violet laser beam inside the optical component gradually increases, which worsens the wave front aberration and decreases the transmittance.

Therefore if the transmittance of the blue-violet laser beam is decreased, that is if the reflectance thereof is increased, by the anti-reflection coat 121 formed on the emission surface 12, the blue-violet laser, which is reflected on the inner face of the emission surface 12 and focused inside the synthetic resin objective lens 10, may cause serious damage to the objective lens 10 made from synthetic resin.

Because of this problem discovered by the inventors, the objective lens 10 of Embodiment 1 is designed such that the transmittance in an area near the optical axis of the inner circumference area 111 is decreased for the red laser beam having the wavelength $\lambda 2$ which is used for recording or reproducing the DVD, but for the blue-violet laser beam having the wavelength $\lambda 1$ which is used for recording or reproducing the BD, the transmittance remains high, preferably at least 95%, in almost all the area from an area near the optical axis in the inner circumference area 111 to an area near the outermost circumference in the outer circumference area 112.

Now a configuration of the anti-reflection coat 121 formed on the objective lens 10 of Embodiment 1 will be described using a concrete example.

FIG. 5 shows a film configuration of an anti-reflection coat constituted by six layer coatings. The anti-reflection coat shown in FIG. 5 is configured by an $SiO_2$ (silicon oxide) layer having a low refractive index, and $Ta_2O_5$ (tantalum oxide) having a high refractive index, which are alternately laminated on a synthetic resin substrate.

Figures 6, 7:
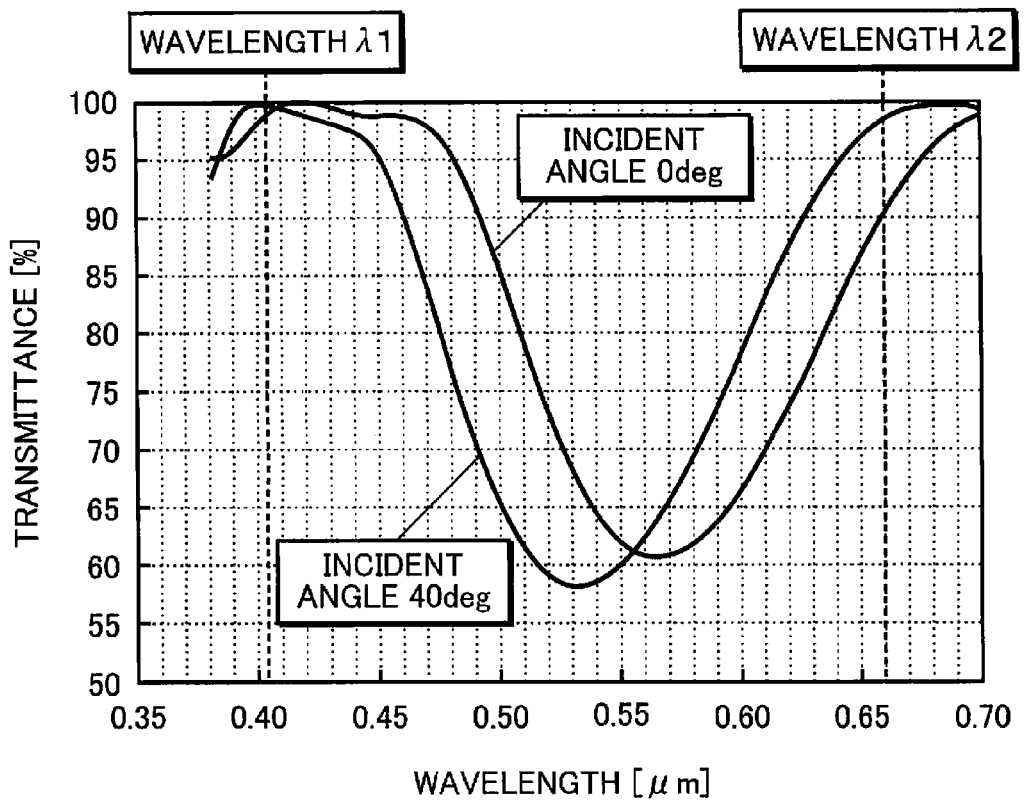
FIG. 6 is a graph depicting a spectral characteristic of transmittance of the anti-reflection coat shown in FIG. 5.
FIG. 7 shows a film configuration of a different anti-reflection coat according to Embodiment 1 of the present invention.

FIG. 6 is a graph depicting a spectral characteristic of transmittance of the anti-reflection coat shown in FIG. 5. FIG. 6 shows a spectral characteristic when the laser beam vertically enters the objective lens, that is, when the incident angle of the laser beam is 0°, and a spectral characteristic when the incident angle of the laser beam is 40°. In FIG. 6, the abscissa is a wavelength, and the ordinate is a transmittance with respect to the wavelength.

The laser beam that enters at a 0° angle is a laser beam that enters the optical axis of the objective lens, and the laser beam that enters at a 40° angle is a laser beam that enters a position of which radius from the optical axis of the objective lens is R2 (outermost circumference portion of the inner circumference area 111).

Characteristics almost similar to the spectral characteristic in FIG. 6 can also be obtained even if the refractive index or the film thickness in the film configuration shown in FIG. 5 deviated about 1% due to manufacturing error.

The materials used for the anti-reflection coat 121 are not limited to $SiO_2$ having a low refractive index and $Ta_2O_5$ having a high refractive index, but at least two types of materials, out of low refractive index materials of which refractive index n at wavelength 500 nm is at least 1.3 and at most 1.55, and high refractive index materials of which refractive index n at wavelength 500 nm is at least 1.7 and at most 2.5, can be used, and the anti-reflection coat 121 may be configured to have at least two layers and at most 30 layers.

For example, a material of which main component is $SiO_2$ or $MgF_2$ can be used for the low refractive index material. A material of which main component is $Ta_2O_5$, $TiO_2$, $CeO_2$, $ZrO_2$, $HfO_2$ or $CeF_3$ can be used for the high refractive index material. Deposition, sputtering, CVD (Chemical Vapor Disposition) or coating, for example, can be used as a method to form the anti-reflection coat 121.

As FIG. 6 shows, the transmittance of the anti-reflection coat 121 of Embodiment 1 at wavelength $\lambda 2$ (=660 nm) when the incident angle is 0° is approximately 90%, and the transmittance at wavelength $\lambda 1$ (=405 nm) when the incident angle is 0° is at least 98%.

The anti-reflection coat 121 formed on the objective lens 10 of Embodiment 1 has a characteristic where the wavelength dependency is low when the wavelength is near $\lambda 1$, and the wavelength dependency is high when the wavelength is near $\lambda 2$. To be more concrete, in the spectral characteristic at the incident angle 0°, the transmittance is at least 95% when the wavelength is near $\lambda 1$ (=405 nm) which is used for recording or reproducing a BD, that is, when the wavelength is in a 395 to 425 nm range more specifically, and the transmittance is inclined when the wavelength is near $\lambda 2$ (=660 nm) which is used for recording or reproducing a DVD, that is, when the wavelength is in a 650 to 680 nm range more specifically. Therefore as FIG. 6 shows, the transmittance increases as the wavelength increases when a wavelength is in a 650 to 680 nm range.

To implement this spectral characteristic, it can be designed that the transmittance becomes a minimum value at a wavelength $\lambda a$ between the wavelength $\lambda 1$ and the wavelength $\lambda 2$. In the case of the anti-reflection coat 121 of Embodiment 1, the wavelength $\lambda a$ is 565 nm, for example.

Here the spectral characteristic is substantially equivalent to the incident angle characteristic, and the characteristic when the spectral characteristic is shifted to the shorter wavelength side indicates the characteristic when the incident angle (emission angle) is large, that is, the characteristic when the incident angle is 40°. In other words, in the spectral characteristic at a 0° incident angle, the transmittance is at least 95% in the wavelength 395 to 425 nm range, so the transmittance is at least 95% at the wavelength $\lambda 1$, regardless the incident angle (emission angle), even if a dispersion of a wavelength, that is ±5 nm, for example, is taken into consideration.

In the wavelength 650 to 680 nm range, on the other hand, the spectral characteristic when the incident angle is 0° is inclined such that the transmittance decreases as the wavelength becomes shorter. Therefore at the wavelength $\lambda 2$, the transmittance is approximately 90% when the incident angle (emission angle) is 0° (corresponds to the point $\alpha$ in FIG. 3), and is at least 99% when the incident angle (emission angle) is 40° (near the outermost circumference of the inner circumference area 111, which corresponds to the point $\beta$ in FIG. 3). Furthermore, the difference of the transmittance values between the point $\alpha$ and the point $\beta$ is maintained, even if a dispersion of a wavelength, that is ±5 nm for example, is taken into consideration, which means that the transmittance is always higher as the incident angle is larger.

As described above, the anti-reflection coat 121 formed on the objective lens 10 of Embodiment 1 is configured so that the transmittance hardly changes when the incident angle (emission angle) is in the 0° to 40° range at the wavelength $\lambda 1$ or near wavelength $\lambda 1$, and the transmittance increases as the incident angle (emission angle) increases at the wavelength $\lambda 2$ or near the wavelength $\lambda 2$. In other words, dependency of transmittance on the incident angle is small near the wavelength $\lambda 1$ and large near the wavelength $\lambda 2$.

As FIG. 2 shows, the outer circumference area 112 of the objective lens 10 of Embodiment 1 is a dedicated area for a BD, and has a diffraction structure in a serrated profile, which is optimized for the wavelength $\lambda 1$, hence the diffraction efficiency is at least 70% is almost all the areas of the outer circumference area 112. In other words, deterioration of focal spots on the information recording surface of the BD can be suppressed, since the difference between the diffraction efficiency in an area near the optical axis of the inner circumference area 111 and the diffraction efficiency in the outer circumference area 112 is substantially small.

Now a configuration of a different anti-reflection coat formed on the objective lens 10 of Embodiment 1 will be described.

FIG. 7 shows a film configuration of an anti-reflection coat constituted by four layer coatings. The anti-reflection coat shown in FIG. 7 as well is configured by an $SiO_2$ (silicon oxide) layer having a low refractive index and $Ta_2O_5$ (tantalum oxide) having a high refractive index, which are alternately laminated on a synthetic resin substrate.

Figure 8:
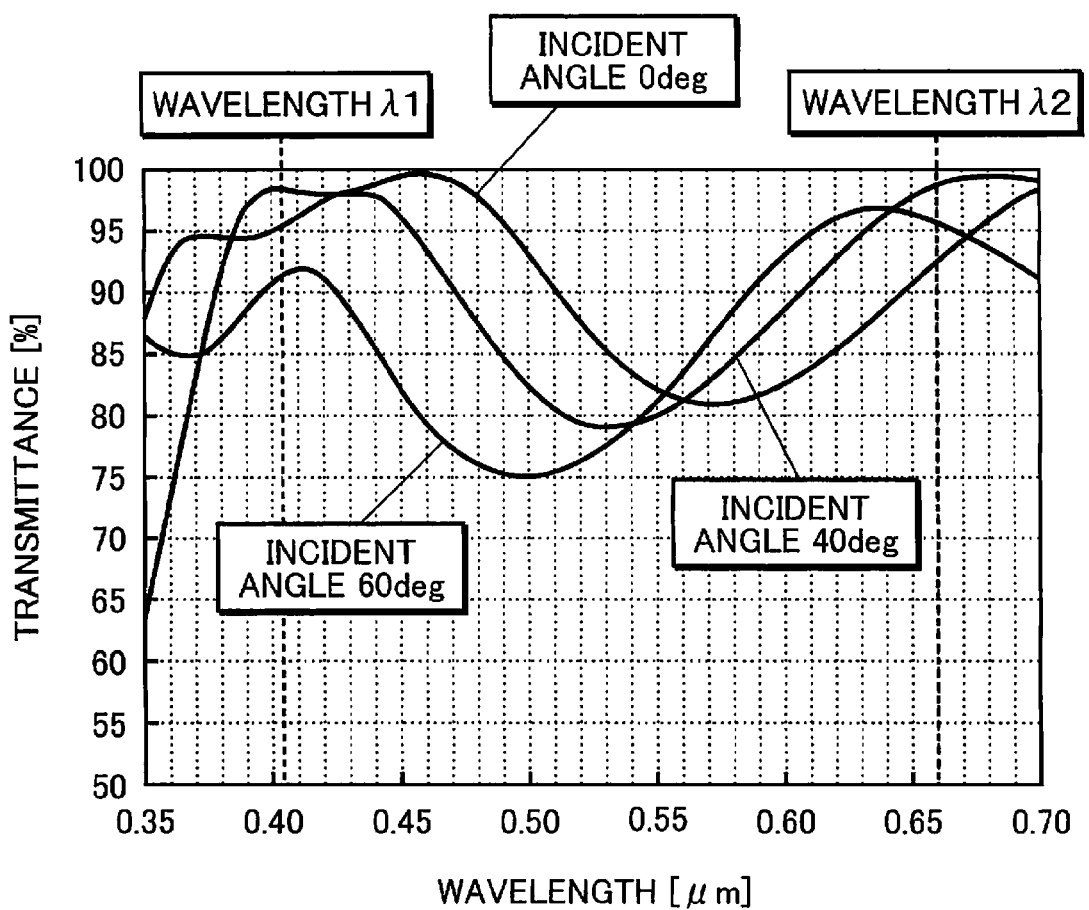
FIG. 8 is a graph depicting a spectral characteristic of transmittance of the different anti-reflection coat shown in FIG. 7.

FIG. 8 is a graph depicting a spectral characteristic of transmittance of the different anti-reflection coat shown in FIG. 7. FIG. 7 shows a spectral characteristic when the laser beam vertically enters the objective lens, that is, when the incident angle of the laser beam is 0°, a spectral characteristic when the incident angle of the laser beam is 40°, and a spectral characteristic when the incident angle of the laser beam is 60°. In FIG. 8, the abscissa is a wavelength, and the ordinate is a transmittance with respect to the wavelength.

The laser beam that enters at a 0° angle is a laser beam that enters the optical axis of the objective lens, the laser beam that enters at a 40° angle is a laser beam that enters a position of which radius from the optical axis of the objective lens is R2 (outermost circumference portion of the inner circumference area 111), and the laser beam that enters at a 60° angle is a laser beam that enters a position of which radius from the optical axis of the objective lens is R1 (outermost circumference position of the outer circumference area 112).

Materials used for this different anti-reflection coat are not limited to $SiO_2$ having a low refractive index and $Ta_2O_5$ having a high refractive index, but may be constituted by at least two types of materials, out of low refractive index materials of which refractive index n at wavelength 500 nm is at least 1.3 and at most 1.55, and high refractive index materials of which refractive index n at wavelength 500 nm is at least 1.7 and at most 2.5. The anti-reflection coat may be configured to have at least two layers and at most 30 layers.

For example, a material of which main component is $SiO_2$ or $MgF_2$ can be used for the low refractive index material. A material of which main component is $Ta_2O_5$, $TiO_2$, $CeO_2$, $ZrO_2$, $HfO_2$ or $CeF_3$ can be used for the high refractive index material. Deposition, sputtering, CVD or coating, for example, can be used as a method to form the anti-reflection coat.

As FIG. 8 shows, the transmittance of the different anti-reflection coat formed on the objective lens 10 of Embodiment 1 at wavelength $\lambda 2$ (=660 nm) is approximately 93% when the incident angle is 0°, and the transmittance thereof at wavelength $\lambda 1$ (=405 nm) is at least 98% when the incident angle is 0°.

The different anti-reflection coat of Embodiment 1 has a characteristic where the wavelength dependency is low when the wavelength is near $\lambda 1$, and is high when the wavelength is near $\lambda 2$. To be more concrete, in the spectral characteristic at the incident angle 0°, the transmittance is at least 95% when the wavelength is near $\lambda 1$ (=405 nm) which is used for recording or reproducing a BD, that is, when the wavelength is in a 395 to 425 nm range more specifically, and the transmittance is inclined when the wavelength is near $\lambda 2$ (=660 nm) which is used for recording or reproducing a DVD, that is, when the wavelength is in a 650 to 680 nm range more specifically. Therefore as FIG. 8 shows, the transmittance increases as the wavelength increases when a wavelength is in a 650 to 680 nm range.

To implement this spectral characteristic it can be designed that the transmittance becomes a minimum value at a wavelength $\lambda a$ between the wavelength $\lambda 1$ and the wavelength $\lambda 2$. In the case of the different anti-reflection coat of Embodiment 1, the wavelength $\lambda a$ is 570 nm, for example.

Here the spectral characteristic is substantially equivalent to the incident angle characteristic, and the characteristic when the spectral characteristic is shift to the shorter wavelength side indicates the characteristic when the incident angle (emission angle) is large, that is, the characteristic when the incident angle is 40°. In other words, in the spectral characteristic at a 0° incident angle, the transmittance is at least 95% in the wavelength 395 to 425 nm range, so the transmittance is at least 95% at the wavelength $\lambda 1$, regardless the incident angle (emission angle), even if a dispersion, that is ±5 nm, for example, is taken into consideration.

In the wavelength 650 to 680 nm range, on the other hand, the spectral characteristic when the incident angle is 0° is inclined such that the transmittance decreases as the wavelength becomes shorter. Therefore at the wavelength $\lambda 2$, the transmittance is approximately 90% when the incident angle (emission angle) is 0° (corresponds to the point α in FIG. 3), and is at least 98% when the incident angle (emission angle) is 40° (near the outermost circumference of the inner circumference area, which corresponds to the point β in FIG. 3). Furthermore, the difference of the transmittance values between the point α and the point β is maintained even if a dispersion of a wavelength, that is ±5 nm, for example, is taken into consideration.

Now this different anti-reflection coat of Embodiment 1 will be described in more detail.

Figure 9:
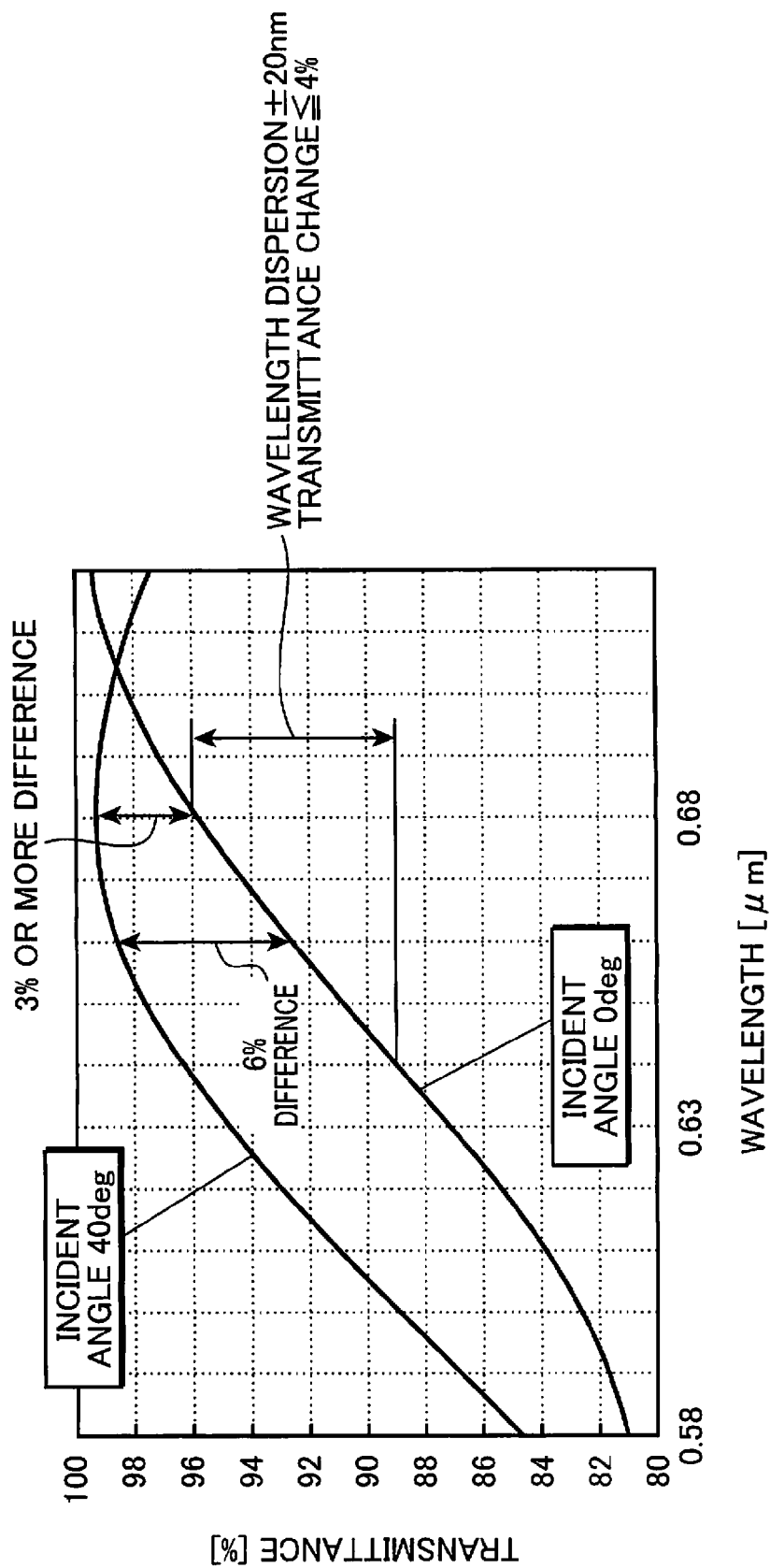
FIG. 9 is an enlarged view of a spectral characteristic of the wavelength band used for recording or reproducing a DVD in the different anti-reflection coat of Embodiment 1 shown in FIG. 8.

FIG. 9 is an enlarged view of the spectral characteristic of the wavelength band used for recording or reproducing a DVD in the different anti-reflection coat of Embodiment 1 shown in FIG. 8.

As FIG. 9 shows, at the wavelength $\lambda 2$ (=660 nm), which is the design central wavelength, for example, the difference between the transmittance when the incidence angle (emission angle) is 0° and the transmittance when the incidence angle (emission angle) is 40° is approximately 6%. If the anti-reflection coat has this characteristic, the transmittance in an area near the optical axis in the inner circumference area 111 can be decreased, and a drop in the intensity of the laser beam along with the increase in the distance from the optical axis can be corrected.

In the case of the different anti-reflection coat of Embodiment 1, the dispersion of the transmittance when the incident angle (emission angle) is 0° can be suppressed to be about ±4%, even if the wavelength is shifted ±20 nm from the wavelength $\lambda 2$ (=660 nm), which is the design central wavelength. Furthermore, the difference between the transmittance when the incident angle (emission angle) is 0° and the transmittance where the incident angle (emission angle) is 40° is at least 3%, even if the wavelength shifted +20 nm from the wavelength $\lambda 2$ (=660 nm), which is the design central wavelength.

Figure 10:
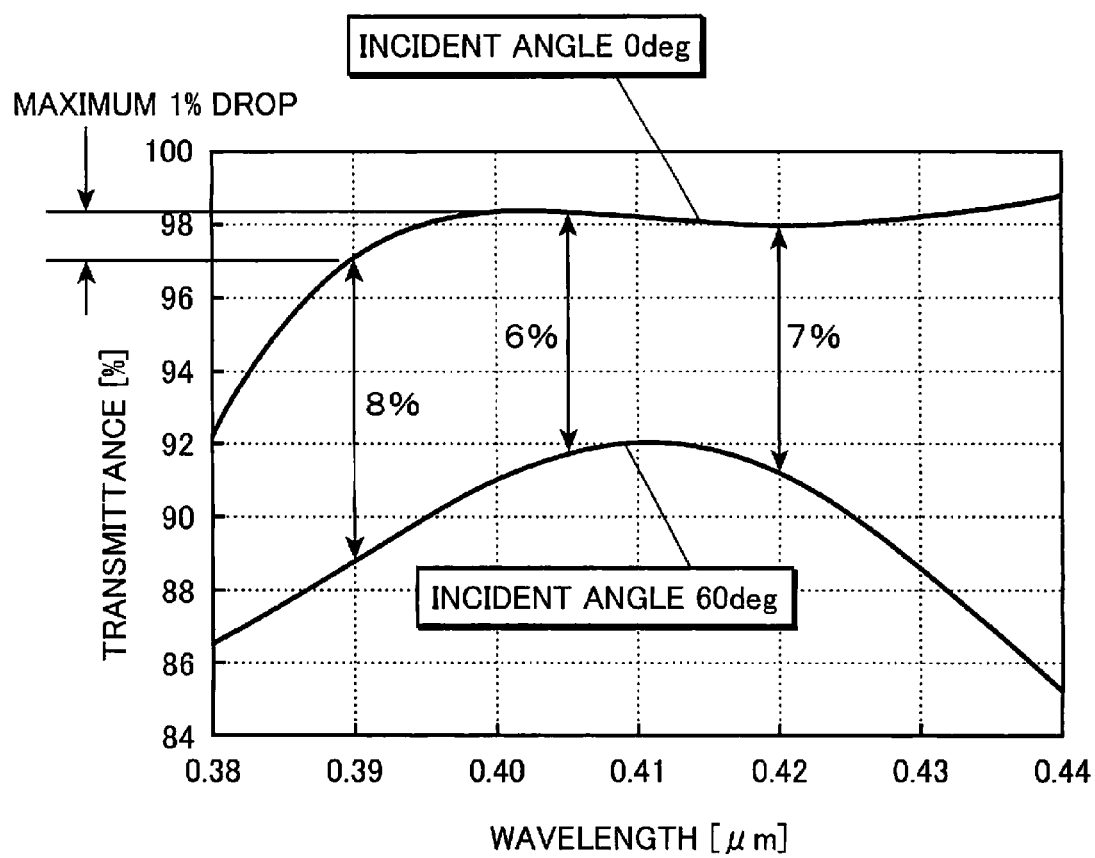
FIG. 10 is an enlarged view of a spectral characteristic of the wavelength band used for recording or reproducing a BD in the different anti-reflection coat of Embodiment shown in FIG. 8.

FIG. 10, on the other hand, is an enlarged view of the spectral characteristic of the wavelength band used for recording or reproducing a BD in the different anti-reflection coat of Embodiment shown in FIG. 8.

As FIG. 10 shows, at wavelength $\lambda 1$ (=405 nm) which is the design central wavelength, for example, the difference between the transmittance when the incidence angle (emission angle) is 0° and the transmittance when the incidence angle (emission angle) is 60° is approximately 6%, and the transmittance in the outermost circumference of the outer circumference area 112, which is a dedicated area for BD, is minimized.

In the spectacle characteristic of the different anti-reflection coat of Embodiment 1, the difference between the transmittance when the incident angle (emission angle) is 0° and the transmittance when the incident angle (emission angle) is 60° hardly changes, even if the wavelength is shifted by ±15 nm from the wavelength λ1 (=405 nm), which is the design central wavelength.

It is known that the spectral characteristic of a multi-layer anti-reflection coat shifts in the wavelength direction if the refractive index or the film thickness of the film configuration is shifted by manufacturing error.

However in the case of the different anti-reflection coat of Embodiment 1, the change of the spectral characteristic when the wavelength is shifted from the design central wavelength is small. Therefore the different anti-reflection coat of Embodiment 1 has excellent characteristics where not only is manufacturing dispersion of the light source wavelength small, but also the change of the spectral characteristic due to manufacturing error of the anti-reflection coat itself is small, in other words, the change in performance of the anti-reflection coat is small.

As FIG. 2 shows, according to the objective lens 10 of Embodiment 1, the outer circumference area 112 is a dedicated area for BD, and in this area, a diffraction structure in a serrated profile, which is optimized for the wavelength λ1, is formed, hence the diffraction efficiency is at least 70% in almost all the areas of the outer circumference area 112. In other words, deterioration of focal spots on the information recording surface of the BD is suppressed, since the difference between the diffraction efficiency in an area near the optical axis in the inner circumference area 111 and the diffraction efficiency in the outer circumference area 112 is substantially small.

As described above, the objective lens 10 of Embodiment 1 has an anti-reflection coat 121, where the transmittance in an area near the optical axis in the inner circumference area 111 is decreased for a red laser beam having wavelength λ2, which is used for recording or reproducing a DVD, so that a drop in intensity of the laser beam along with the increase in the distance from the optical axis is corrected, and at least 95% transmittance is obtained in almost all the areas from an area near the optical axis of the inner circumference area 111 to the outermost circumference of the outer circumference area 112 for a blue-violet laser beam having wavelength λ1, which is used for recording or reproducing a BD. As a consequence, deterioration of focal spots on the information recording surface of the DVD can be suppressed, and a new problem, where the blue-violet laser beam reflected on the inner surface of the emission face of the objective lens is focused inside the objective lens, damaging the lens, can be solved.

Furthermore, according to the objective lens 10 of Embodiment 1, the outer circumference area 112 is a dedicated area for a BD, and in this outer circumference area 112, a diffraction structure in a serrated profile, which is optimized for the blue-violet laser beam having the wavelength λ1, is formed, hence the diffraction efficiency is at least 70% in almost all the areas of the outer circumference area 112, and deterioration of focal spots on the information recording surface of the BD can be suppressed.

The diffraction structure that is formed on a compatible objective lens according to the present invention is not limited to the configuration described in Embodiment 1, but is also applicable to the case when the inner circumference area 111 and the outer circumference area 112 have a serrated profile respectively, or to the case when the diffraction structure is not formed in the outer circumference area 112.

The present invention is not limited to the above mentioned configuration described in Embodiment 1, but may be implemented as an objective lens made from synthetic resin, that converges a laser beam having a wavelength λ1 (390 nm≤λ1≤430 nm) onto an information recording surface a first information recording medium, and converges a laser beam having a wavelength λ2 (630 nm≤λ2≤680 nm) onto an information recording surface of a second information recording medium, wherein the spectral characteristic of an anti-reflection coat formed on the objective lens when the laser beam vertically enters is: a maximum value T1max and a minimum value T1min of a transmittance in a range of the wave length λ1−10 nm to the wavelength λ1+20 nm satisfy 0.95≤T1min/T1max≤1.0; a transmittance T2w1 at the wavelength λ2−10 nm and the transmittance T2w2 at the wavelength λ2+20 nm satisfy T2w1<T2w2; and the transmittance is minimum at a wavelength λa (λ1<λa<λ2).

In order to solve the problem that the blue-violet laser beam, reflected on the inner face of the emission surface of the objective lens, focuses inside the objective lens and damages the lens, it is preferable that the minimum value of the transmittance T1min is at least 92%, and at least 95% is even better. In terms of designing the anti-reflection coat, the minimum value of the transmittance T1min is less than 100%, that is at most 99.6% to be more exact.

The objective lens made from synthetic resin converges a laser beam having a wavelength λ1 (390 nm≤λ1≤430 nm) that transmits through an area, of which radius from the optical axis of the objective lens is R1 [mm], onto the information recording surface of the first information recording medium, and converges a laser beam having a second wavelength λ2 (630 nm≤λ2≤680 nm) that transmits through an area, of which radius from the optical axis of the objective lens is R2 [mm], onto the information recording surface of the second information recording medium. It is preferable that a transmittance T1a [%] in an area near the optical axis of the objective lens with respect to the laser beam having the wavelength and a transmittance T1r [%] in an area near the area of which radius is R1 of the objective lens with respect to the laser beam having the wavelength λ1, satisfy 0.95≤T1a/T1r≤1.05, and a transmittance T2a [%] in the area near the optical axis of the objective lens with respect to the laser beam having the wavelength λ2, and a transmittance T2r [%] in an area near the area of which radius is R2 of the objective lens with respect to the laser beam having the wavelength λ2 satisfy, 0.85≤T2a/T2r≤0.95.

In order to solve the problem that the blue-violet laser beam, reflected on the inner face of the emission surface of the objective lens, focuses inside the objective lens and damages the lens, it is preferable that the transmittance of the laser beam having the wavelength λ1 is at least 92%, in the entire area of which radius from the optical axis of the objective lens is R1 [mm], the transmittance T2a is at least 85% and less than 95%, and the transmittance T2r is at least 95%.

Furthermore, it is more preferable that the transmittance of the laser beam having the wavelength λ1 is at least 95% in the entire area of which radius from the optical axis of the objective lens is R1 [mm], the transmittance T2a is at least 85% and less than 95%, and the transmittance T2r is at least 95%.

A transmittance T1_0 [%] of the anti-reflection coat when an incident angle of a first laser beam having a first wavelength λ1 (390 nm≤λ1≤430 nm) is 0° and a transmittance T1_40 [%] of the anti-reflection coat when an incident angle of the first laser beam is 40° satisfy 0.95≤T1_0/T1_40≤1.05, and a transmittance T2_0 [%] of the anti-reflection coat when an incident angle of a second laser beam having a second wavelength λ2 (630 nm≤λ2≤680 nm) is 0° and a transmittance T2_40 [%] of the anti-reflection coat when an incident angle of the second laser beam is 40° satisfy 0.85≤T2_0/T2_40≤0.97.

The transmittance T1_0 [%] of the anti-reflection coat and a transmittance T1_60 [%] of the anti-reflection coat when the incident angle of the first laser beam is 60° satisfy $0.90 \leq T1\_60/T1\_0 \leq 0.95$.

In the area of which radius is R2, the transmittance of the first laser beam is at least 92%, the transmittance T2_0 is at least 85% and less than 96%, and the transmittance T2_40 is at least 94%.

The transmittance T2_0 in a range of the second wavelength $\lambda 2 \pm 20$ nm is within the transmittance T2_0±4%.

The outer circumference area 112 from the radius R2 to the radius R1 converges the first laser beam onto the information recording surface of the BD (first information recording medium), and is generated an aberration in the second laser beam so that the second laser beam is not converged onto the information recording surface of the DVD (second information recording medium).

Embodiment 2

Figure 11:
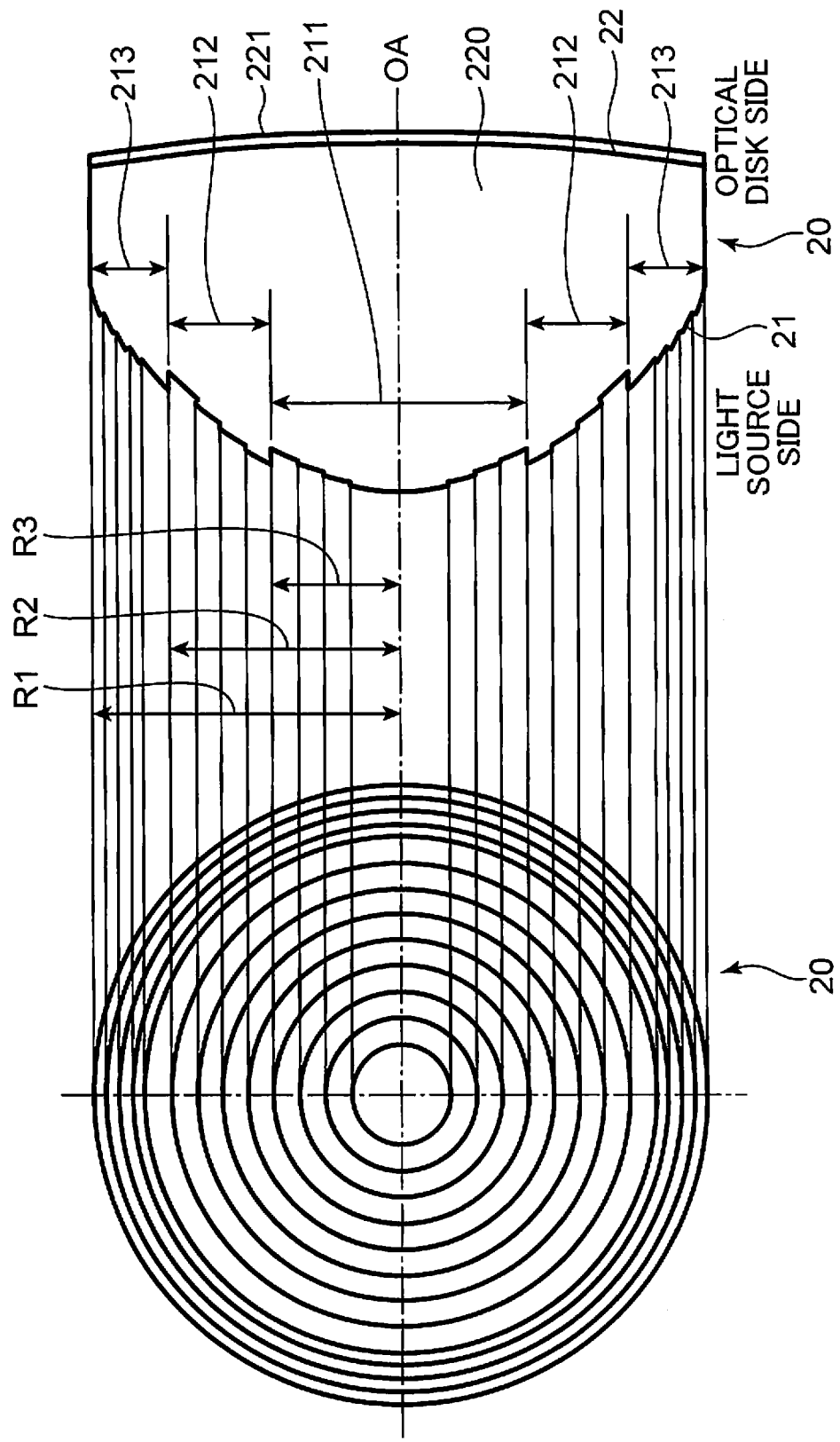
FIG. 11 is a diagram depicting a configuration of an objective lens according to Embodiment 2 of the present invention.

FIG. 11 is a diagram depicting a configuration of an objective lens according to Embodiment 2 of the present invention. The left drawing in FIG. 11 is a schematic plan view depicting a configuration of a synthetic resin objective lens 20 of Embodiment 2, and the right drawing in FIG. 11 is a schematic cross-sectional view depicting the configuration of the objective lens 20 of Embodiment 2.

The objective lens 20 of Embodiment 2 is used as a compatible objective lens used for a BD where information is recorded or reproduced using a blue-violet laser beam having a wavelength $\lambda 1$, a DVD where information is recorded or reproduced using a red laser beam having a wavelength $\lambda 2$ ($\lambda 1 < \lambda 2$), and a CD where information is recorded or reproduced using an infrared laser beam having a wavelength $\lambda 3$ ($\lambda 2 < \lambda 3$).

The objective lens 20 has a spherical surface or an aspherical surface to be a base on an entrance surface 21 on the light source side (side where the laser beam enters). On the spherical surface or the aspherical surface to be a base (hereafter generically called "base aspherical surface"), a zonal diffraction structure is formed with the optical axis OA of the objective lens 20 as the center. An emission surface 22 on the optical disk side (side where the laser beam is emitted), which faces the entrance surface 21, is a spherical surface or an aspherical surface.

The objective lens 20 is an objective lens made from synthetic resin, that converges a laser beam emitted from the laser light source onto an information recording surface of an information recording medium. The objective lens 20 comprises a lens 220 having an entrance surface 21 (first surface) facing the laser light source, and an emission surface 22 (second surface) facing the information recording medium, and an anti-reflection coat 221 formed on the emission surface 22.

As to the diffraction structure formed on the entrance surface 21, the inner circumference area 211 which includes the optical axis OA, the mid-circumference area 212 located on the periphery of the inner circumference area 211, and the outer circumference area 213 located on the periphery of the mid-circumference area 212 have a different structure from one another.

The inner circumference area 211 has a diffraction structure in a stepped profile of which one cycle has eight steps, and is a compatible area which can be used for recording or reproducing the CD using the infrared laser beam having the wavelength $\lambda 3$, recording or reproducing the DVD using the red laser beam having the wavelength $\lambda 2$, and recording or reproducing the BD using the blue-violet laser beam having the wavelength $\lambda 1$. The inner circumference area 211 is designed to converge the plus second-order diffracted light of the blue-violet laser beam onto the information recording surface of the BD via the light transmission layer with approximately a 0.1 mm thickness, converge the minus second-order diffracted light of the red laser beam onto the information recording surface of the DVD via the light transmission layer with approximately a 0.6 mm thickness, and converge the minus third-order diffracted light of the infrared laser beam onto the information recording surface of the CD via the light transmission layer with approximately a 1.2 mm thickness. The inner circumference area 211 is an area corresponding to an NA of the CD (approximately 0.47 to 0.52).

The mid-circumference area 212 has a diffraction structure in a stepped profile of which one cycle has four steps, and is a compatible area which can be used for recording or reproducing the DVD using the red laser beam having the wavelength $\lambda 2$, and recording or reproducing the BD using the blue-violet laser beam having the wavelength $\lambda 1$. The mid-circumference area 212 is designed to converge the plus first-order diffracted light of the blue-violet laser beam onto the information recording surface of the BD via the light transmission layer with approximately a 0.1 mm thickness, and converge the minus first-order diffracted light of the red laser beam onto the information recording surface of the DVD via the light transmission layer with approximately a 0.6 mm thickness. The mid-circumference area 212 is also designed so that the infrared laser beam having the wavelength $\lambda 3$ generates an aberration on the CD, that is, the focal spot of the infrared laser beam greatly shifts from the focal point. In other words, the infrared laser beam which transmitted through the mid-circumference area 212 has an aberration on the information recording surface of the CD. Therefore the mid-circumference area 212 substantially functions as an aperture stop when the CD is recorded or reproduced. The mid-circumference area 212 is an area corresponding to an NA of the DVD (approximately 0.60 to 0.65).

The NA used when information is recorded on or reproduced from the BD using the blue-violet laser beam (approximately 0.85) is greater than the NA used when information is recorded on or reproduced from the DVD using the red laser beam (approximately 0.60 to 0.65). Therefore the outer circumference area 213 is designed to be a dedicated area for the BD, and to converge only the blue-violet laser beam having the wavelength $\lambda 1$ on the information recording surface of the BD. The outer circumference area 213 is designed so that an aberration is generated in the infrared laser beam having the wavelength $\lambda 3$ on the information recording surface of the CD, and an aberration is generated in the red laser beam having the wavelength $\lambda 2$ on the information recording surface of the DVD. Therefore the outer circumference area 213 substantially functions as an aperture stop upon recording or reproducing the DVD. In other words, the infrared laser beam which transmitted through the outer circumference area 213 has an aberration on the information recording surface of the CD, and the red laser beam which transmitted through the outer circumference area 213 has an aberration on the information recording surface of the DVD. Therefore the outer circumference area 213 substantially functions as an aperture stop when the CD or the DVD is recorded or reproduced.

The lens 220 converges a first laser beam having a first wavelength $\lambda 1$ (390 nm $\leq \lambda 1 \leq$ 430 nm) that transmits through an area, of which radius from the optical axis OA of the objective lens 20 is R1, of the entrance surface 21, onto the information recording surface of the BD. The lens 220 also converges a second laser beam having a second wavelength $\lambda 2$ (630 nm $\leq \lambda 2 \leq$ 680 nm) that transmits through an area, of which radius from the optical axis OA of the objective lens 20 is R2 (R2<R1), of the entrance surface 21, onto the information recording surface of the DVD. Furthermore, the lens 220 converges a third laser beam having a third wavelength λ3 (760 nm≤λ3≤800 nm) that transmits through an area, of which radius from the optical axis of the objective lens 20 is R3 (R3<R2), of the entrance surface 21, onto the information recording surface of the CD.

One unit of the step difference of the diffraction structure of the inner circumference area 211 is an amount to generate approximately a 1.25×λ1 [nm] of optical path difference for the blue-violet laser beam having the wavelength λ1 (e.g. λ1=405 nm), and the phase modulation amount is π/2 per step. In this case, the diffraction efficiency of the plus second-order diffracted light is approximately 80% based on the scalar calculation, which is highest among the orders of diffraction.

On the other hand, one unit of the step difference of the diffraction structure of the inner circumference area 211 is an amount to generate approximately a 0.75×λ2 [μm] of optical path difference for the red laser beam having the wavelength λ2 (e.g. λ2=660 nm), and the phase modulation amount is −π/2 per step. In this case, the diffraction efficiency of the minus second-order diffracted light is approximately 80% based on the scalar calculation, which is highest among the orders of diffraction.

One unit of the step difference of the diffraction structure of the inner circumference area 211 is also an amount to generate approximately a 0.63×λ3 [nm] of optical path difference for the infrared laser beam having the wavelength λ3 (e.g. λ3=780 nm) and the phase modulation amount is −2π/3 per step. In this case, the diffraction efficiency of the minus third-order diffracted light is approximately 60% based on the scalar calculation, which is highest among the orders of diffraction.

One unit of the step difference of the diffraction structure of the mid-circumference area 212 is an amount to generate approximately a 1.25×λ1 [nm] of optical path difference for the blue-violet laser beam having the wavelength λ1 (e.g. λ1=405 nm) and the phase modulation amount is π/2 per step. In this case, the diffraction efficiency of the plus first-order diffracted light is approximately 80% based on the scalar calculation, which is highest among the orders of diffraction.

On the other hand, one unit of the step difference of the diffraction structure of the mid-circumference area 212 is an amount to generate approximately a 0.75×λ2 [nm] optical path difference for the red laser beam having the wavelength λ2 (e.g. λ2=660 nm) and the phase modulation amount is −π/2 per step. In this case, the diffraction efficiency of the minus first-order diffracted light is approximately 80% based on the scalar calculation, which is highest among the orders of diffraction.

If the inner circumference area 211 has this diffraction structure, serrated profiles in approximately opposite directions can be generated between the wavelength λ1 and the wavelength λ2, and serrated profiles in approximately opposite directions can be generated between the wavelength λ1 and the wavelength λ3. If the mid-circumference area 212 has this diffraction structure, serrated profile in approximately opposite directions can be generated between the wavelength λ1 and the wavelength λ2. Therefore compatible recording or compatible reproduction can be implemented, with high light utilization efficiency, for the CD having the light transmission layer with approximately a 1.2 mm thickness, the DVD having the light transmission layer with approximately a 0.6 mm thickness, and the BD having the light transmission layer with approximately a 0.1 mm thickness.

The objective lens 20 of Embodiment 2 is characterized in that the anti-reflection coat 221, of which transmittance changes according to the wavelength and the incident angle, is formed on the emission surface 22.

Figure 12:
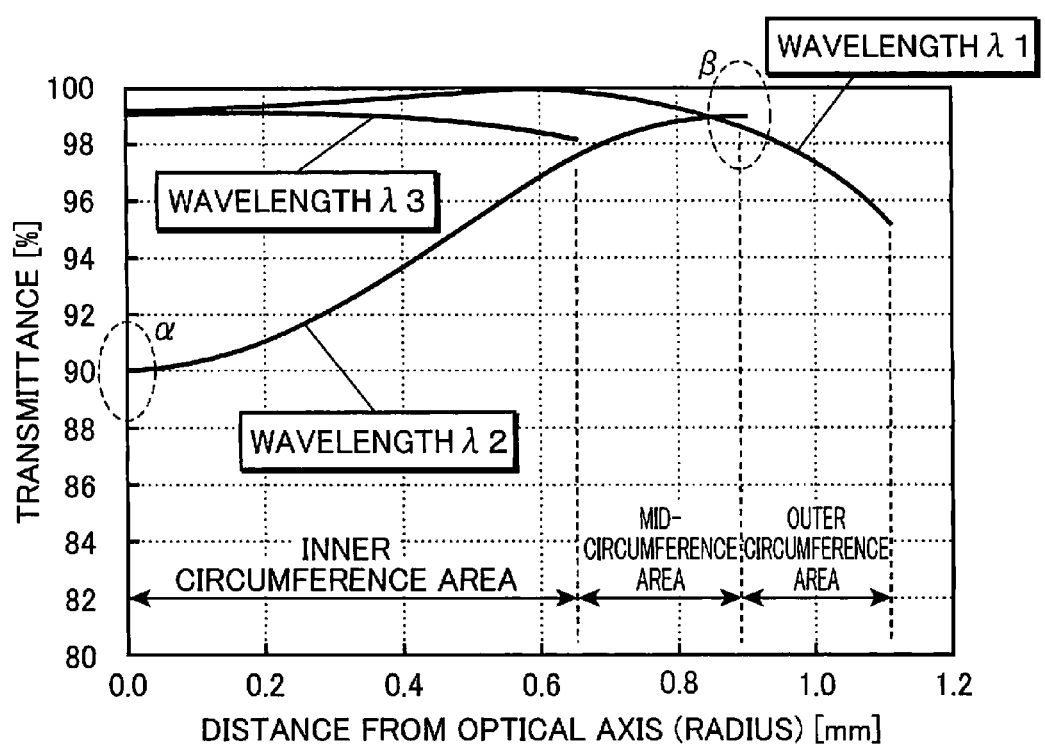
FIG. 12 is a graph depicting a transmittance of an anti-reflection coat formed on the objective lens according to Embodiment 2 of the present invention.

FIG. 12 is a graph depicting a transmittance distribution of the blue-violet laser of which wavelength is λ1 (=405 nm), the red laser beam of which wavelength is λ2 (=660 nm), and the infrared laser beam of which wavelength is λ3 (=780 nm) on the anti-reflection coat 221 formed on the objective lens 20 according to Embodiment 2 of the present invention. In FIG. 12, the abscissa is the entrance position of the laser beam, that is, the distance from the optical axis OA (radius of the objective lens), and the ordinate is the transmittance of the laser beam, transmitted through the entrance position, on the emission surface 22.

As FIG. 12 shows, at the wavelength λ2, the transmittance in an area near the optical axis (point α) in the inner circumference area 211 is approximately 90%, while the transmittance in an area near the outermost circumference (point β) in the mid-circumference area 212 is at least 99%.

As described above, by the anti-reflection coat 221 formed on the emission surface 22 of the objective lens 20, the transmittance in an area near the optical axis in the inner circumference area 211 is decreased. Thereby a drop in the intensity of the laser beam along with the increase in the distance from the optical axis can be corrected, and deterioration of focal spots by the red laser beam formed on the information recording surface of the DVD can be suppressed.

At wavelength λ1, on the other hand, the transmittance distribution is approximately flat with at least 98% from an area near the optical axis (point α) in the inner circumference area 211 to an area near the outermost circumference (point β) in the mid-circumference area 212, and the transmittance is also at least 95% in the entire area of the outer circumference area 213.

According to the objective lens 20 of Embodiment 2, the outer circumference area 213 is a dedicated area for the BD, where the diffraction structure in a serrated profile optimized with the wavelength λ1 is formed, hence the diffraction efficiency is exhibited at 70% or more in almost all the areas of the outer circumference area 213. More specifically, the difference between the diffraction efficiency in a position near the optical axis in the inner circumference area 211 and the diffraction efficiency in the outer circumference area 213 is substantially small, whereby deterioration of the focal spot on the information recording surface of the BD can be suppressed.

In the case of the infrared laser beam having the wavelength λ3 used for recording or reproducing the CD, the influence of the intensity of the laser beam on the deterioration of focal spots along with the increase in the distance from the optical axis is minor. Therefore there is no substantial problem that is generated, even without decreasing the transmittance of the laser beam having the wavelength λ3 in an area near the optical axis in the inner circumference area 211.

All this being said, it is obvious that a configuration may be developed in which correction is made when the transmittance of the laser beam having the wavelength λ3 in an area near the optical axis in the inner circumference area 211 is decreased and the intensity of the lease beam is reduced gradually as the distance from the optical axis is increased. In use of such a configuration, in order to obtain abovementioned DVD and BV spectral properties, the optimum selection may be sought with respect to coating material, the number of coating layers and the coating thickness for the anti-reflection coat 221.

As described above, the objective lens 20 of Embodiment 2 has an anti-reflection coat 221, where the transmittance in an area near the optical axis in the inner circumference area 211 is decreased for a red laser beam having wavelength λ2, which is used for recording or reproducing a DVD, so that a drop in intensity of the laser beam along with the increase in the distance from the optical axis is corrected, and at least 95% transmittance is obtained in almost all the areas from an area near the optical axis of the inner circumference area 211 to the outermost circumference of the outer circumference area 213 for a blue-violet laser beam having wavelength which is used for recording or reproducing a BD. As a consequence, deterioration of focal spots on the information recording surface of the DVD can be suppressed, and a new problem, where the blue-violet laser beam reflected on the inner surface of the emission face of the objective lens is focused inside the objective lens, damaging the lens, can be solved.

Furthermore in the objective lens 20 in Embodiment 2, the outer circumference area 213 is a dedicated area for the BD, and the diffraction structure in the serrated profile, optimized with the blue-violet laser beam having the wavelength λ1, is formed, and at least 70% transmittance is obtained in almost all the areas the outer circumference area 213, therefore deterioration of the focal spot on the information recording surface of the BD can also be suppressed.

Another major effect is that the objective lens 20 of Embodiment 2 is also applicable to recording or reproducing the CD using the infrared laser beam.

The diffraction structure that is formed on a compatible objective lens is not limited to the configuration described in Embodiment 2, but is also applicable to the case when the inner circumference area 211, the mid-circumference area 212 and the outer circumference area 214 have a serrated profile respectively, or to the case when the diffraction structure is not formed in the outer circumference area 213.

The present invention is not limited to the above mentioned configuration described in Embodiment 2, but may be implemented as an objective lens made from synthetic resin, that converges a laser beam having a wavelength λ1 (390 nm≤λ1≤430 nm) onto an information recording surface of a first information recording medium, converges a laser beam having a wavelength λ2 (630 nm≤λ2≤680 nm) onto an information recording surface of a second information recording medium, and converges a laser beam having a wavelength λ3 (760 nm≤λ3≤800 nm) onto an information recording surface of a third information recording medium, wherein the spectral characteristic of an anti-reflection coat formed on the objective lens when the laser beam vertically enters is: a maximum value T1max and a minimum value T1min of a transmittance in a range of the wavelength λ1−10 nm to the wavelength λ1+20 nm satisfy 0.95≤T1min/T1max<1.0; a transmittance T2w1 at the wavelength λ2−10 nm and a transmittance T2w2 at the wavelength λ2+20 nm satisfy T2w1<T2w2; the transmittance is minimum at the wavelength λa (λ1<λa<λ2); a maximum value T3max and a minimum value T3min of a transmittance in a range of the wavelength λ3−10 nm to the wavelength λ3+20 nm satisfy 0.95≤T3min/T3max<1.0.

The objective lens made from synthetic resin converges a laser beam having the wavelength λ1 (390 nm≤λ1≤430 nm) that transmits through an area, of which radius from the optical axis of the objective lens is R1 [mm], onto the information recording surface of the first information recording medium, converges a laser beam having the wavelength λ2 (630 nm≤λ2≤680 nm) that transmits through an area, of which radius from the optical axis of the objective lens is R2 (R1>R2) [mm], onto the information recording surface of the second information recording medium, and converges a laser beam having the wavelength λ3 (760 nm≤λ3≤800 nm) that transmits through an area, of which radius from the optical axis of the objective lens is R3 (R2>R3) [mm], onto the information recording surface of the third information recording medium. It is preferable that a transmittance T1a [%] in an area near the optical axis of the objective lens with respect to the laser beam having the wavelength λ1 and a transmittance T1r [%] in an area near the area of which radius is R1 of the objective lens with respect to the laser beam having the wavelength λ1 satisfy 0.95≤T1a/T1r≤1.05, a transmittance T2a [%] in the area near the optical axis of the objective lens with respect to the laser beam having the wavelength λ2 and a transmittance T2r [%] in an area near the area of which radius is R2 of the objective lens with respect to the laser beam having the wavelength λ2 satisfy 0.85≤T2a/T2r≤0.95, and a transmittance T3a [%] in the area near the optical axis of the objective lens with respect to the laser beam having the wavelength λ3 and a transmittance T3r [%] in an area near the area of which radius is R3 of the objective lens with respect to the laser beam having the wavelength λ3 satisfy 0.95≤T3a/T3r≤1.05.

The present invention can also be applied to the case when the transmittance T3a [%] in the area near the optical axis of the objective lens with respect to the laser beam having the wavelength λ3 and a transmittance T3r [%] in the area near the area of which radius is R3 of the objective lens with respect to the laser beam having the wavelength λ3 satisfy 0.85≤T3a/T3r≤0.95.

A transmittance T1_0 [%] of the anti-reflection coat when an incident angle of a first laser beam having a first wavelength λ1 (390 nm≤λ1≤430 nm) is 0°, and a transmittance T1_40 [%] of the anti-reflection coat when an incident angle of the first laser beam is 40° satisfy 0.95≤T1_0/T1_40≤1.05, and a transmittance T2_0 [%] of the anti-reflection coat when an incident angle of a second laser beam having a second wavelength λ2 (630 nm≤λ2≤680 nm) is 0°, and a transmittance T2_40 [%] of the anti-reflection coat when an incident angle of the second laser beam is 40° satisfy 0.85≤T2_0/T2_40≤0.97.

The transmittance T1_0 [%] of the anti-reflection coat and a transmittance T1_60 [%] of the anti-reflection coat when the incident angle of the first laser beam is 60° satisfy 0.90≤T1_60/T1_0≤0.95.

The laser beam that enters at a 0° angle is a laser beam that enters the optical axis of the objective lens, the laser beam that enters at a 40° angle is a laser beam that enters a position of which radius from the optical axis of the objective lens is R2 (outermost circumference portion of the mid-circumference area 212), and the laser beam that enters at a 60° angle is a laser beam that enters a position of which radius from the optical axis of the objective lens is R1 (outermost circumference portion of the outer circumference area 213).

In the area of which radius is R2, the transmittance of the first laser beam is at least 92%, the transmittance T2_0 is at least 85% and less than 96%, and the transmittance T2_40 is at least 94%.

The transmittance T2_0 in a range of the second wavelength λ2±20 nm is within the transmittance T2_0±4%.

The mid-circumference area 212 from the radius R3 to the radius R2 converges the first laser beam onto the information recording surface of the BD (first information recording media), converges the second laser beam onto the information recording surface of the DVD (second information recording media), and is generated an aberration in the third laser beam so that the third laser beam is not converged onto the information recording surface of the CD (third information recording media). The outer circumference area 213 from the radius R2 to the radius R1 converges the first laser beam onto the information recording surface of the BD (first information recording media), is generated an aberration in the second laser beam so that the second laser beam is not converged onto the information recording surface of the DVD (second information recording media), and is generated an aberration in the third laser beam so that the third laser beam is not converged onto the information recording surface of the CD (third information recording media).

In Embodiment 1 and Embodiment 2, a case of forming the anti-reflection coat on the emission surface (optical disk side) of the objective lens was described, but the present invention is not limited to this configuration. In other words, it is clear that an effect similar to the case of forming the anti-reflection coat on the emission surface is also obtained in the case of forming an anti-reflection coat having a spectral characteristic similar to that of this embodiment on the entrance surface (light source side) of the objective lens. Furthermore, it is clear that an effect similar to the case of forming the anti-reflection coat on the emission surface is also obtained in the case of forming the anti-reflection coat on both the emission surface and the entrance surface of the objective lens so as to obtain the spectral characteristic similar to that of Embodiment 1 and Embodiment 2.

It is preferable that the anti-reflection coat is formed at least on the emission surface of the objective lens in order to prevent damage to the objective lens made from synthetic resin, in the case should the objective lens and the optical disk collide due to a retraction problem of the servo, vibration or impact.

In the description of this embodiment, the inner circumference area 211 has a diffraction structure in a stepped profile of which one cycle has eight steps, for example, and is designed to converge the plus second-order diffracted light of the blue-violet laser beam onto the information recording surface of the BD via the light transmission layer with approximately a 0.1 mm thickness, converge the minus second-order diffracted light of the red laser beam onto the information recording surface of the DVD via the light transmission layer with approximately a 0.6 mm thickness, and converge the minus third-order diffracted light of the infrared laser beam onto the information recording surface of the CD via the light transmission layer with approximately a 1.2 mm thickness, but the present invention is not limited to this configuration.

For example, the inner circumference area 211 may have a diffraction structure in a stepped profile of which one cycle has six steps, and is designed to converge the plus second-order diffracted light of the blue-violet laser beam onto the information recording surface of the BD via the light transmission layer with approximately a 0.1 mm thickness, converge the minus first-order diffracted light of the red laser beam onto the information recording surface of the DVD via the light transmission layer with approximately a 0.6 mm thickness, and converge the minus second-order diffracted light of the infrared laser beam onto the information recording surface of the CD via the light transmission layer with approximately a 1.2 mm thickness. Needless to say, the present invention is applicable to the configuration of the inner circumference area 211, which has a diffraction structure of a stepped profile of which one cycle has seven steps, and is designed to converge the plus first-order diffracted light of the blue-violet laser beam onto the information recording surface of the BD via the light transmission layer with approximately a 0.1 mm thickness, converge the minus second-order diffracted light of the red laser beam onto the information recording surface of the DVD via the light transmission layer with approximately a 0.6 mm thickness, and converge the minus third-order diffracted light of the infrared laser beam onto the information recording surface of the CD via the light transmission layer with approximately a 1.2 mm thickness.

Embodiment 3

Figure 13:
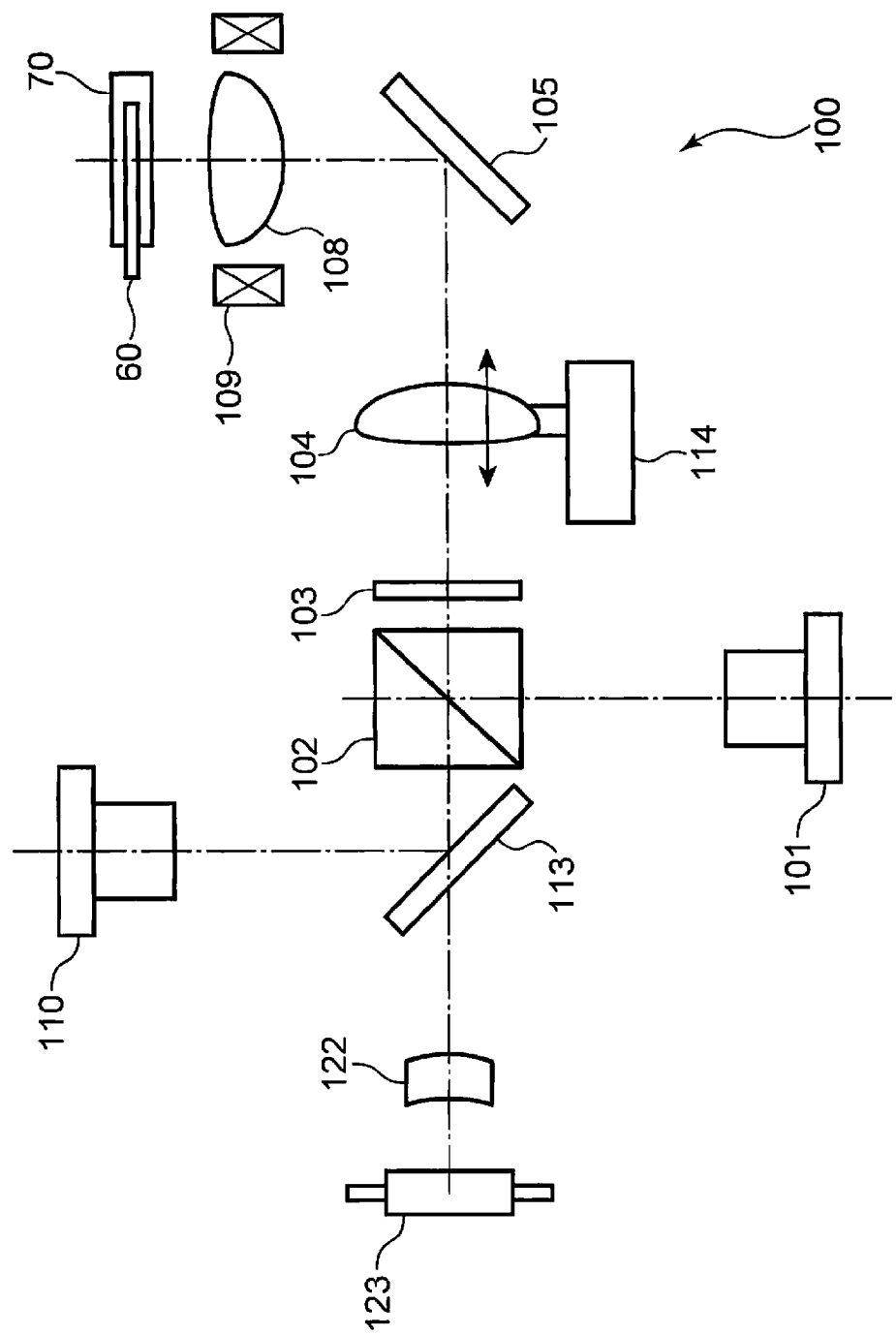
FIG. 13 is a diagram depicting a general configuration of an optical head according to Embodiment 3 of the present invention.

FIG. 13 is a diagram depicting a general configuration of an optical head according to Embodiment 3 of the present invention.

In FIG. 13, the optical head 100 has a blue-violet laser light source 101 which emits a blue-violet laser beam, a polarization beam splitter 102, a ¼ wavelength plate 103, a collimator lens 104, a mirror 105, an objective lens 108, an objective lens actuator 109, a red laser light source 110 emitting the red laser beam, a plane beam splitter 113, a collimator lens actuator 114, a detection lens 122 and a light receiving element 123. For the BD 60, information is recorded or reproduced by a blue-violet laser beam, and for the DVD 70, information is recorded or reproduced by a red laser beam.

The blue-violet laser light source 101 emits a blue-violet laser beam (a first laser beam) having a first wavelength $\lambda 1$ (390 nm≤$\lambda 1$≤430 nm). The red laser light source 110 emits a red laser beam (a second laser beam) having a second wavelength $\lambda 2$ (630 nm≤$\lambda 2$≤680 nm).

The objective lens 108 converges the blue-violet laser beam emitted from the blue-violet laser light source 101 on the information recording surface of the BD 60 (first information recording medium), and converges the red laser beam emitted from the red laser light source 110 on the information recording surface of the DVD 70 (second information recording medium).

First the operation of the optical head 100, when information is recorded on or reproduced from the BD 60, will be described. The blue-violet laser beam having an approximately 405 nm wavelength emitted from the blue-violet laser light source 101 enters the polarization beam splitter 102 as an S-polarized light. The blue-violet laser beam reflected by the polarization beam splitter 102 is transformed into a circularly polarized light by the ¼ wavelength plate 103, and is then transformed into parallel rays by the collimator lens 104. The blue-violet laser beam transformed into parallel rays is reflected by the mirror 105, whereby the optical axis is diffracted. The blue-violet laser beam reflected by the mirror 105 is converted on the information recording surface of the BD 60 as a light spot by the objective lens 108.

The blue-violet laser beam reflected by the information recording surface of the BD 60 transmits through the objective lens 108 again, and is reflected by the mirror 105. The blue-violet laser beam reflected by the mirror 105 transmits through the collimator lens 104, and is then transformed into a linearly polarized light, which is different from that by the previous transformation, by the ¼ wavelength plate 103. Then the blue-violet laser beam enters the polarization beam splitter 102 and the plane beam splitter 113 as a P-polarized light. The blue-violet laser beam transmitted through the polarization beam splitter 102 and the plane beam splitter 113 is guided to the light receiving element 123 via the detection lens 122. The light receiving element 123 performs photoelectric conversion on the detected blue-violet laser beam, and generates a focus error signal for following up the surface moving of the BD 60 and a tracking error signal for following up the decentering of the BD 60.

Now the operation of the optical head 100, when information is recorded on or reproduced from the DVD 70, will be described. The red laser beam having the approximately 660 nm wavelength emitted from the red laser light source 110 enters the plane beam splitter 113 as S-polarized light. The red laser beam reflected by the plane beam splitter 113 transmits through the polarization beam splitter 102, and is transformed into a circularly polarized light by the ¼ wavelength plate 103, and is then transformed into parallel rays by a collimator lens 104. The red laser beam transformed into parallel rays is reflected by the mirror 105, whereby the optical axis is diffracted. The red laser beam reflected by the mirror 105 is converged on the information recording surface of the DVD 70, by the objective lens 108, as a light spot.

The red laser beam reflected by the information recording surface of the DVD 70 transmits through the objective lens 108 again, and is reflected by the mirror 105. The red laser beam reflected by the mirror 105 transmits through the collimator lens 104, and is transformed into a linearly polarized light, which is different from that of the previous transformation, by the ¼ wavelength plate 103. Then the red laser beam enters the polarization beam splitter 102 and the plane beam splitter 114 as a P-polarized light. The red laser beam transmitted through the polarization beam splitter 102 and the plane beam splitter 114 is guided to the light receiving element 123 via the detection lens 122. The light receiving element 123 performs photoelectric conversion on the detected red laser beam, and generates a focus error signal for following up the surface moving of the DVD 70 and a tracking error signal for following up the decentering of the DVD 70.

Here the objective lens 108, used for the optical head 100 of Embodiment 3, is the objective lens 10 made from synthetic resin described in Embodiment 1.

Therefore the objective lens 108 has the anti-reflection coat 121, where the transmittance in an area near the optical axis in the inner circumference area 111 is decreased for a red laser beam used for recording or reproducing a DVD 70 so that a drop in the intensity of the laser beam along with the increase in the distance from the optical axis is corrected, and at least 95% transmittance is obtained in all the areas from an area near the optical axis of the inner circumference area 111 to the outer circumference area for a blue-violet laser beam used for recording or reproducing a BD 60. As a consequence, deterioration of focal spots on the information recording surface of the DVD 70 can be suppressed, and a new problem that the blue-violet laser beam reflected on the inner face of the emission surface of the objective lens is focused inside the objective lens, damaging the lens, can be solved.

Furthermore, the outer circumference area 112 of the objective lens 108 is a dedicated area for a BD, and in the outer circumference area 112, a diffraction structure in a serrated profile, which is optimized for the blue-violet laser beam, is formed, hence the diffraction efficiency is at least 70% in almost all the areas of the outer circumference area 112, and deterioration of focal spots on the information recording surface of the BD 60 can be suppressed.

As described above, the optical head 100 of Embodiment 3 can ideally record or reproduce information on or from the BD and DVD respectively.

The red laser light source 110 of the optical head 100 of Embodiment 3 may be a two-wavelength laser light source which emits a red laser beam and an infrared laser beam, and the objective lens 108 may be either one of the synthetic resin objective lenses 20 described in Embodiment 2. In this case, information can ideally be recorded on or reproduced from the BD, the DVD and a CD respectively.

Embodiment 4

Figure 14:
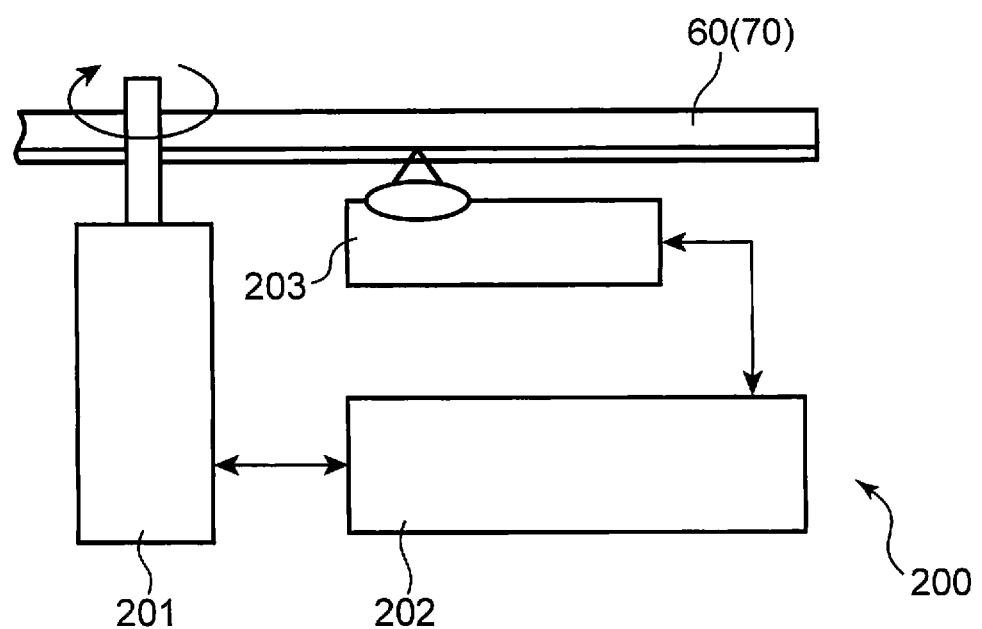
FIG. 14 is a diagram depicting a general configuration of an optical disk device according to Embodiment 4 of the present invention.

FIG. 14 is a diagram depicting a general configuration of an optical disk device according to Embodiment 4 of the present invention.

In FIG. 14, the optical disk device 200 has an optical disk drive unit 201, a control unit 202 and an optical head 203.

The optical disk drive unit 201 rotates the BD 60 (for the DVD 70). The optical head 203 is the optical head 100 described in Embodiment 3. The control unit 202 controls the driving of the optical disk drive unit 201 and the optical head 203, and performs signal processing for a control signal and an information signal when photoelectric conversion was performed by the optical head 203. The control unit 202 also has a function to interface with an information signal between the inside and the outside of the optical disk device 200.

The control unit 202 receives a control signal obtained by the optical head 203, and performs focus control, tracking control, information reproduction control and rotation control for the optical disk drive unit 201 based on the control signal. The control unit 202 also reproduces information from an information signal, and transmits a recording signal to the optical head 203.

The optical disk device 200, which includes the optical head 100 described in Embodiment 3, can ideally record or reproduce information on or from the BD 60 and the DVD 70. Furthermore the optical disk device 200 can also ideally record or reproduce information on or from the BD, the DVD and the CD respectively.

Embodiment 5

Figure 15:
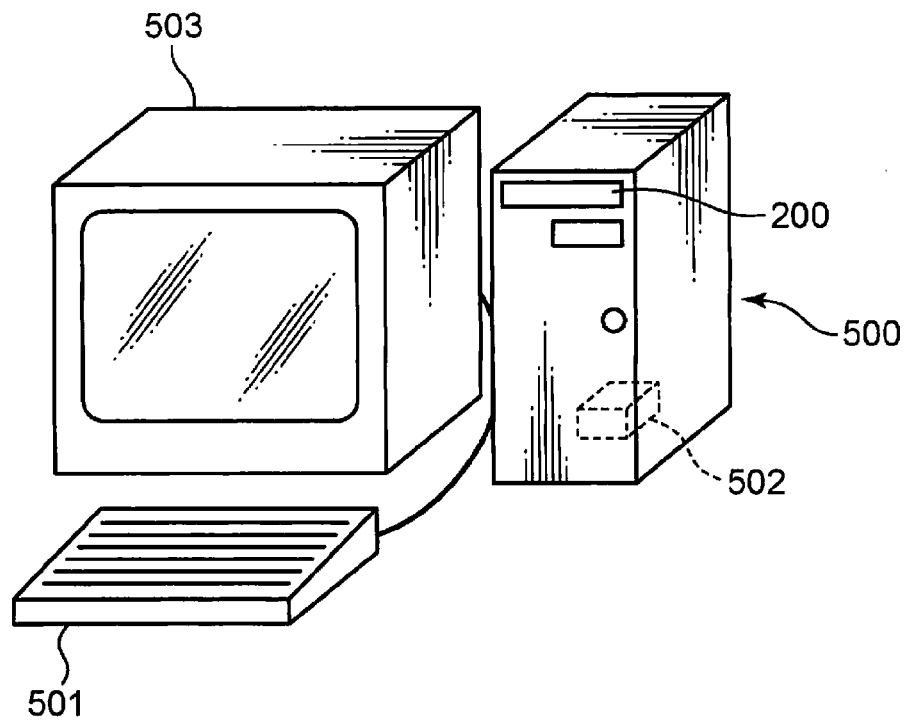
FIG. 15 is a diagram depicting a general configuration of a computer according to Embodiment 5 of the present invention.

FIG. 15 is a diagram depicting a general configuration of a computer according to Embodiment 5 of the present invention.

In FIG. 15, the computer 500 has the optical disk device 200 of Embodiment 4, an input device 501 for inputting information, such as a keyboard, a mouse and a touch panel, a computing unit 502, such as a central processing unit (CPU) which performs computing based on the information input from the input device 501 and information read from the optical disk device 200, and an output device 503, including a cathode ray tube or liquid crystal display which displays information, such as a computing result by the computing unit 502, or a printer which prints out information.

In Embodiment 5, the computer 500 corresponds to an example of the information processing device, and the computing unit 502 corresponds to an example of the information processing unit.

The computer 500, which includes the optical disk device 200 of Embodiment 4, can ideally record or reproduce information on or from the BD and the DVD, and can therefore be used for a wide range of applications. Furthermore the computer 500 can also ideally record or reproduce information on or from the BD, the DVD and the CD respectively, and can therefore be used for an even wider range of applications.

Embodiment 6

Figure 16:
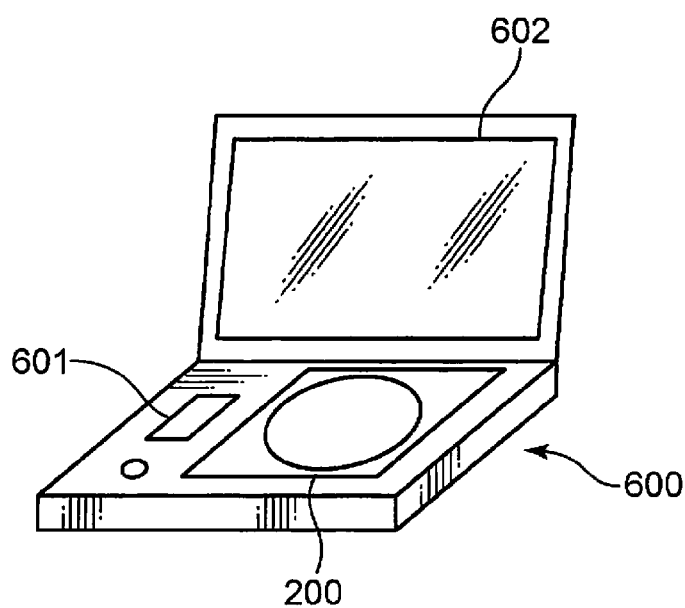
FIG. 16 is a diagram depicting a general configuration of an optical disk player according to Embodiment 6 of the present invention.

FIG. 16 is a diagram depicting a general configuration of an optical disk player according to Embodiment 6 of the present invention.

In FIG. 16, the optical disk player 600 has the optical disk device 200 of Embodiment 4, and a decoder 601, which converts an information signal obtained from the optical disk device 200 into an image signal.

The optical disk player 600 can also be used as a car navigation system by adding a position sensor, such as a GPS (Global Positioning System), and a central processing unit (CPU). The optical disk player 600 may include a display device 602, such as a liquid crystal display.

In Embodiment 6, the optical disk player 600 corresponds to an example of the information processing device, and the decoder 601 corresponds to an example of the information processing device.

The optical disk player 600, which includes the optical disk device 200 of Embodiment 4, can ideally record or reproduce information on or from the BD or the DVD, and can therefore be used for a wide range of applications. Furthermore the optical disk player 600 can also ideally record or reproduce information on or from the BD, the DVD and the CD respectively, and can therefore be used for an even wider range of applications.

Embodiment 7

Figure 17:
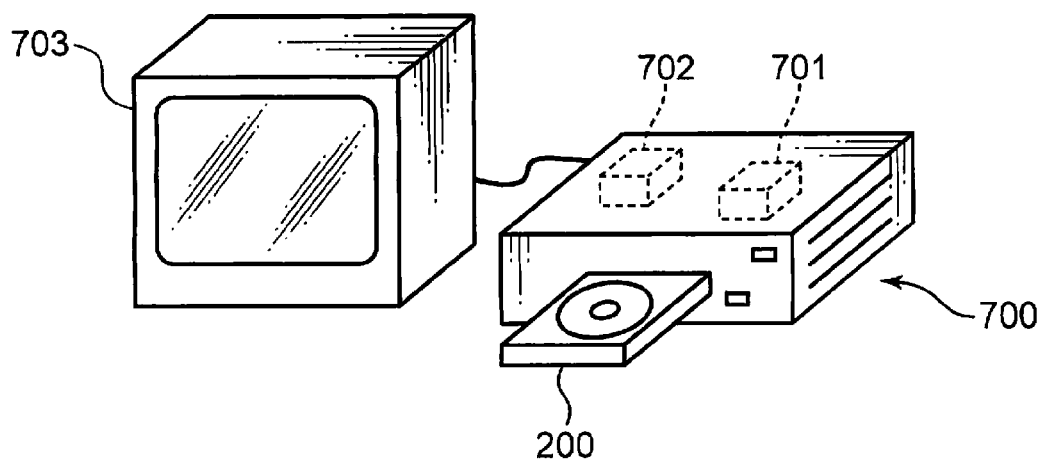
FIG. 17 is a diagram depicting a general configuration of an optical disk recorder according to Embodiment 7 of the present invention.

FIG. 17 is a diagram depicting a general configuration of an optical disk recorder according to Embodiment 7 of the present invention.

In FIG. 17, the optical disk recorder 700 has the optical disk device 200 of Embodiment 4, and an encoder 701 which converts image information into an information signal for the optical disk device 200 to record on an optical disk. It is preferable that the optical disk recorder 700 further has a decoder 702 for converting the information signal obtained by the optical disk device 200 into image information, then the recorded image can be reproduced. The optical disk recorder 700 may have an output device 703, including a cathode ray tube or a liquid crystal display which display information, or a printer which prints out information.

In Embodiment 7, the optical disk recorder 700 corresponds to an example of the information processing device, and the encoder 701 and the decoder 702 correspond to an example of the information processing unit.

The optical disk recorder 700, which includes the optical disk device 200 of Embodiment 4, can ideally record or reproduce information on or from the BD and the DVD, and therefore can be used for a wide range of applications. Furthermore the optical disk recorder 700 can also ideally record or reproduce information on or from the BD, the DVD and the CD respectively, and can be used for an even wider range of applications.

Embodiment 8

Figure 18:
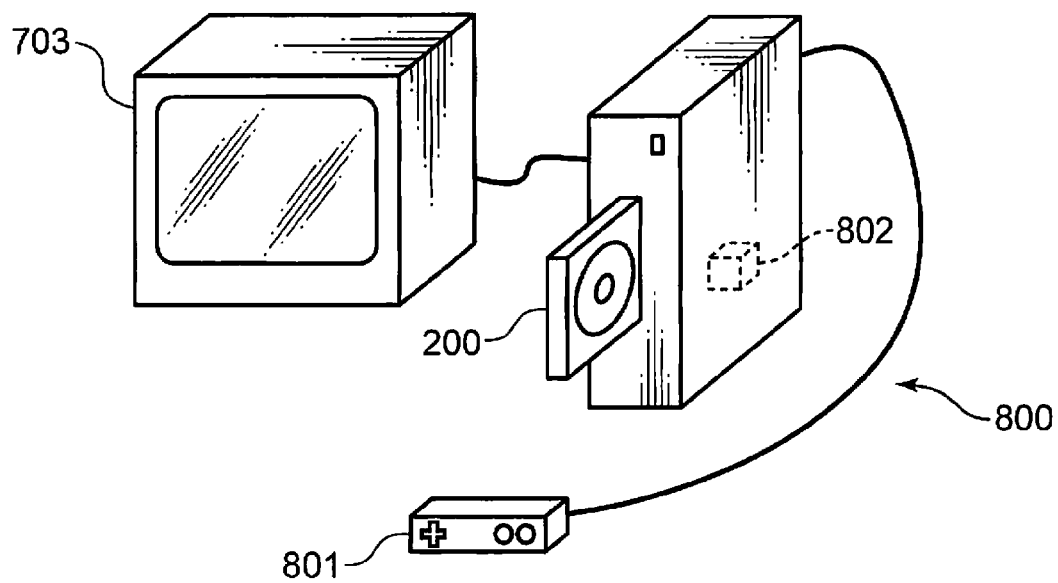
FIG. 18 is a diagram depicting a general configuration of a game device according to Embodiment 8 of the present invention.
Figure 19:
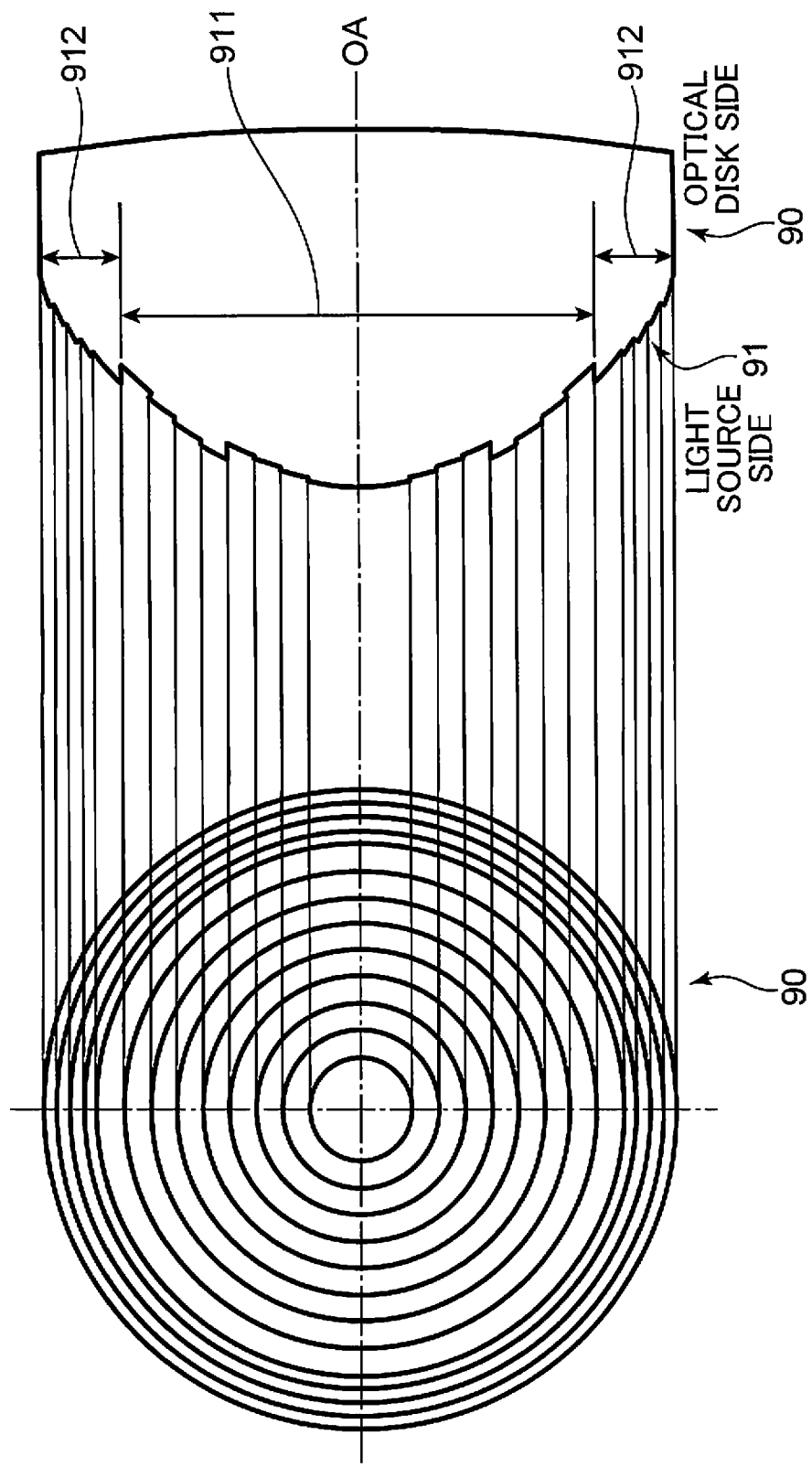
FIG. 19 is a diagram depicting the configuration of a conventional objective lens.
Figure 20:
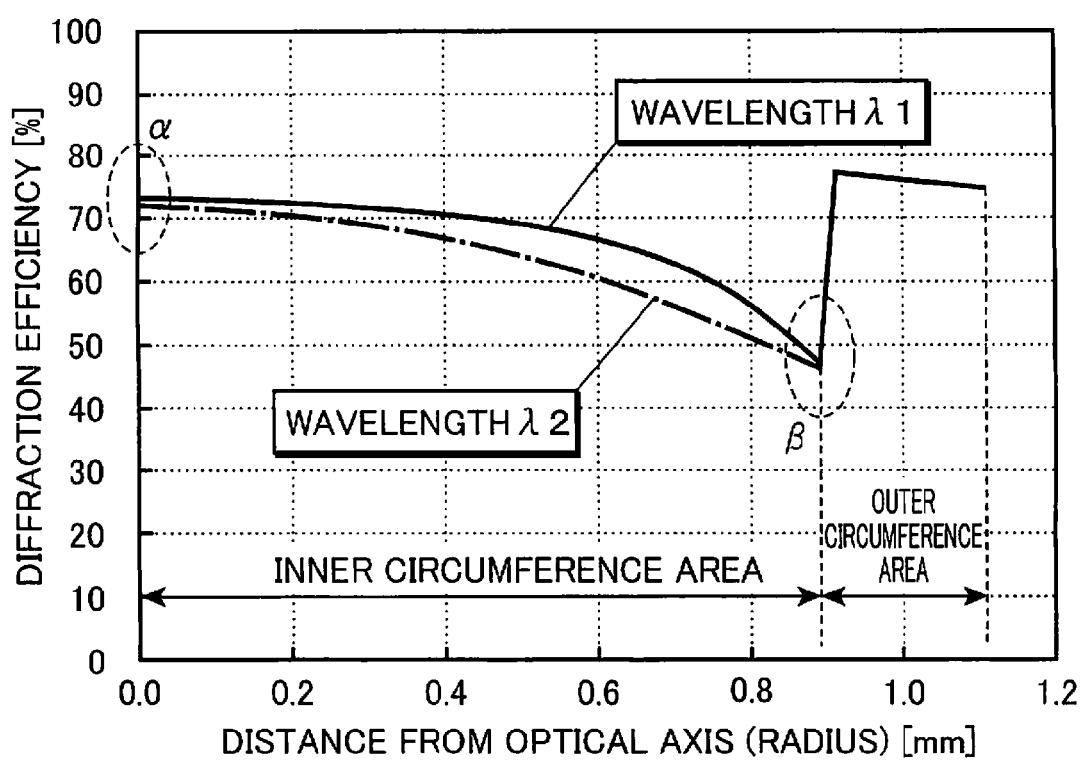
FIG. 20 is a diagram depicting the diffraction efficiency of a conventional objective lens.

FIG. 18 is a diagram depicting a general configuration of a game device according to Embodiment 8 of the present invention.

In FIG. 18, the game device 800 has the optical disk device 200 of Embodiment 4, an operation unit 801 for the user to input operation information, and a computing unit 802, such as a central processing unit (CPU) which performs computing based on the operation information input from the operation unit 801 and information read from the optical disk device 200. The game device 800 may include a display device 803, such as a display for displaying information.

In Embodiment 8, the game device 800 corresponds to an example of the information processing device, and the computing unit 802 corresponds to an example of the information processing unit.

The game device 800, which includes the optical disk device 200 of Embodiment 4, can ideally record or reproduce information on or from the BD and the DVD, and therefore can be used for a wide range of applications. Furthermore the game device 800 can also ideally record or reproduce information on or from the BD, the DVD and the CD respectively, and therefore can be used for an even wider range of applications.

The above mentioned embodiments mainly include the invention that has the following configurations.

An objective lens according to an aspect of the present invention is an objective lens made from synthetic resin, that converges a laser beam emitted from a laser light source onto an information recording surface of an information recording medium, this objective lens comprising: a lens having a first surface facing the laser light source and a second surface facing the information recording medium; and an anti-reflection coat formed on the second surface, wherein the lens converges a first laser beam having a first wavelength $\lambda 1$ (390 nm$\leq \lambda 1 \leq$430 nm) that transmits through an area, of which radius from an optical axis of the objective lens is R1, of the first surface, onto an information recording surface of a first information recording medium, and converges a second laser beam having a second wavelength $\lambda 2$ (630 nm$\leq \lambda 2 \leq$680 nm) that transmits through an area, of which radius from the optical axis of the objective lens is R2 (R2<R1), of the first surface, onto an information recording surface of a second information recording medium that is different from the first information recording medium, a transmittance T1_0 [%] of the anti-reflection coat when an incident angle of the first laser beam is 0° and a transmittance T1_40 [%] of the anti-reflection coat when the incident angle of the first laser beam is 40° satisfy $0.95 \leq T1\_0/T1\_40 \leq 1.05$, and a transmittance T2_0 [%] of the anti-reflection coat when an incident angle of the second laser beam is 0° and a transmittance T2_40 [%] of the anti-reflection coat when the incident angle of the second laser beam is 40° satisfy $0.85 \leq T2\_0/T2\_40 \leq 0.97$.

According to this configuration, an objective lens made from synthetic resin that converges a laser beam emitted from a laser light source onto an information recording surface of an information recording medium comprises a lens having a first surface facing the laser light source and a second surface facing the information recording medium, and an anti-reflection coat formed on the second surface. The lens converges a first laser beam having a first wavelength $\lambda 1$ (390 nm$\leq \lambda 1 \leq$430 nm) that transmits through an area, of which radius from an optical axis of the objective lens is R1, of the first surface, onto an information recording surface of a first information recording medium. The lens also converges a second laser beam having a second wavelength $\lambda 2$ (630 nm$\leq \lambda 2 \leq$680 nm) that transmits through an area, of which radius from the optical axis of the objective lens is R2 (R2<R1), of the first surface, onto an information recording surface of a second information recording medium which is different from the first information recording medium. A transmittance T1_0 [%] of the anti-reflection coat when an incident angle of the first laser beam is 0° and a transmittance T1_40 [%] of the anti-reflection coat when the incident angle of the first laser beam is 40° satisfy $0.95 \leq T1\_0/T1\_40 \leq 1.05$, and a transmittance T2_0 [%] of the anti-reflection coat when an incident angle of the second laser beam is 0° and a transmittance T2_40 [%] of the antireflection when the incident angle of the second laser beam is 40° satisfy $0.85 \leq T2\_0/T2\_40 \leq 0.97$.

Therefore the transmittance of the second laser beam in the vicinity of the optical axis is dropped by the anti-reflection coat formed on the second surface of the objective lens, whereby a drop in the intensity of the second laser beam along with the increase in the distance from the optical axis can be corrected, and deterioration of focal spots caused by a drop in the diffraction efficiency can be suppressed.

In this objective lens, it is preferable that the transmittance T1_0 [%] of the anti-reflection coat and a transmittance T1_60 [%] of the anti-reflection coat when the incident angle of the first laser beam is 60° satisfy $0.90 \leq T1\_60/T1\_0 \leq 0.95$.

According to this configuration, in the case of the first laser beam having the first wavelength λ1 (390 nm≤λ1≤430 nm), the transmittance in the vicinity of the optical axis is maintained to be higher than the transmittance in a position where the laser beam enters at a 60° angle, that is, in an outermost circumference portion of an area of which radius is R1, hence it can be prevented that the first laser beam is reflected on an inner face of the emission surface of the objective lens, damaging the objective lens.

In this objective lens, it is preferable that in the area of which radius is R2, a transmittance of the first laser beam is at least 92%, the transmittance T2_0 is at least 85% and less than 96%, and the transmittance T2_40 is at least 94%.

According to this configuration, in the area of which radius is R2, the transmittance of the first laser beam is at least 92%, the transmittance T2_0 is at least 85% and less than 96%, and the transmittance T2_40 is at least 94%.

Therefore by setting the transmittance of the first laser beam to at least 92%, it can be prevented that the first laser beam reflected on the inner face of the emission surface of the objective lens focuses inside the objective lens, damaging the lens.

In this objective lens, it is preferable that the transmittance T2_0 in a range of the second wavelength λ2±20 nm is within a range of the transmittance T2_0±4%.

According to this configuration, the dispersion of the transmittance when the incident angle is 0° can be suppressed to be about ±4%, even if the wavelength is shifted ±20 nm from the second wavelength λ2.

In this objective lens, it is preferable that a diffraction structure is formed on the first surface, and the area from the radius R2 to the radius R1 converges the first laser beam onto the information recording surface of the first information recording medium, and is generated an aberration in the second laser beam so that the second laser beam is not converted onto the information recording surface of the second information recording medium.

According to this configuration, in the area from the radius R2 to the radius R1, the first laser beam can be converged onto the information recording surface of the first information recording medium when the first information recording medium is recorded or reproduced, and the aperture of the second laser can be restricted when the second information recording medium is recorded or reproduced.

In this objective lens, it is preferable that the lens converges a third laser beam having a third wavelength λ3 (760 nm≤λ3≤800 nm) that transmits through an area, of which radius from the optical axis of the objective lens is R3 (R3<R2), of the first surface, onto an information recording surface of a third information recording medium which is different from the first information recording medium and the second information recording medium.

According to this configuration, a compatible objective lens can be provided for the first information recording medium where information is recorded or reproduced using the first laser beam having the first wavelength λ1, the second information recording medium where information is recorded or reproduced using the second laser beam having the second wavelength λ2, and the third information recording medium where information is recorded or reproduced using the third laser beam having the third wavelength λ3.

In this objective lens, it is preferable that the transmittance T3a [%] of the third laser beam in the vicinity of the optical axis of the objective lens and the transmittance T3r [%] of the third laser beam in the vicinity of the radius R3 of the objective lens satisfy 0.95≤T3a/T3r≤1.05.

According to this configuration, the transmittance of the third laser beam can be maintained to be approximately constant in an area from the optical axis of the objective lens to the radius R3 of the objective lens.

In this objective lens, it is preferable that the transmittance the transmittance T3a [%] of the third laser beam in the vicinity of the optical axis of the objective lens and the transmittance T3r [%] of the third laser beam in the vicinity of the radius R3 of the objective lens satisfy 0.85≤T3a/T3r≤0.95.

According to this configuration, the transmittance T3a [%] of the third laser beam in the vicinity of the optical axis of the objective lens and the transmittance T3r [%] of the third laser beam in the vicinity of the radius R3 of the objective lens satisfy 0.85≤T3a/T3r≤0.95, hence if the transmittance of the third laser beam in the vicinity of the optical axis is decreased by the anti-reflection coat formed on the second surface of the objective lens, a drop in the intensity of the third laser beam, along with the increase in the distance from the optical axis, can be corrected, and deterioration of focal spots caused by a drop in the diffraction efficiency can be suppressed.

In this objective lens, it is preferable that a diffraction structure is formed on the first surface, wherein the area from the radius R3 to the radius R2 converges the first laser beam onto the information recording surface of the first information recording medium, converges the second laser beam onto the information recording surface of the second information recording medium, and is generated an aberration in the third laser so that the third laser beam is not converged onto the information recording surface of the third information recording medium, and the area from the radius R2 to the radius R1 converges the first laser beam onto the information recording surface of the first information recording medium, is generated an aberration in the second laser beam so that the second laser beam is not converged onto the information recording surface of the second information recording medium, and is generated an aberration in the third laser beam so that the third laser beam is not converged onto the information recording surface of the third information recording medium.

According to this configuration, in the area from the radius R3 to the radius R2, the first laser beam can be converged onto the information recording surface of the first information recording medium when the first information recording medium is recorded or reproduced, the second laser beam can be converged onto the information recording surface of the second information recording medium when the second information recording medium is recorded or reproduced, and the aperture of the third laser beam can be restricted when the third information recording medium is recorded or reproduced. In the area from the radius R2 to the radius R1, the first laser beam can be converged onto the information recording surface of the first information recording medium when the first information recording medium is recorded or reproduced, the aperture of the second laser beam can be restricted when the second information recording medium is recorded or reproduced, and the aperture of the third laser beam can be restricted when the third information recording medium is recorded or reproduced.

In this objective lens, it is preferable that the anti-reflection coat is configured to have at least two layers and at most 30 layers, and each layer of the anti-reflection coat is made from at least two types of materials, out of low refractive index materials of which refractive index n at wavelength 500 nm is at least 1.3 and at most 1.55, and high refractive index materials of which refractive index n at wavelength 500 nm is at least 1.7 and at most 2.5.

According to this configuration, the anti-reflection coat can be made from at least two types of materials, out of low refractive index materials of which refractive index n at wavelength 500 nm is at least 1.3 and at most 1.55, and high refractive index materials of which refractive index n at wavelength 500 nm is at least 1.7 and at most 2.5.

In this objective lens, it is preferable that the low refractive index material is a material of which main component is $SiO_2$ or $MgF_2$, and the high refractive index material is a material of which main component is $Ta_2O_5$, $TiO_2$, $CeO_2$, $ZrO_2$, $HfO_2$ or $CeF_3$.

According to this configuration, the anti-reflection coat can be made from at least two types of materials, out of the low refractive index materials of which main component is $SiO_2$ or $MgF_2$, and the high refractive index materials of which main component is $Ta_2O_5$, $TiO_2$, $CeO_2$, $ZrO_2$, $HfO_2$ or $CeF_3$.

An optical head according to another aspect of the present invention comprises: a first laser light source that emits a first laser beam having a first wavelength $\lambda 1$ (390 nm$\leq \lambda 1 \leq$430 nm); a second laser light source that emits a second laser beam having a second wavelength $\lambda 2$ (630 nm$\leq \lambda 2 \leq$680 nm); any one of the above mentioned objective lenses that converges the first laser beam emitted from the first laser light source onto an information recording surface of a first information recording medium, and converges the second laser beam emitted from the second laser light source onto an information recording surface of a second information recording medium; and a light receiving unit that receives the first laser beam or the second laser beam reflected by the first information recording medium or the second information recording medium. On the basis of this configuration, the abovementioned objective lens may be applied to an optical head.

An optical disk device according to another aspect of the present invention comprises: the above mentioned optical head; a motor which rotates a first information recording medium and a second information medium; and a control unit which controls the optical head and the motor. According to this configuration, the above mentioned optical head can be applied to the optical disk device.

An information processing device according to another aspect of the present invention comprises: the above mentioned optical disk device, and an information processing unit which processes information recorded on the optical disk device and/or information reproduced from the optical disk device. According to this configuration, the above mentioned optical disk device can be applied to the information processing device.

Embodiments or examples described in "Description of Embodiments" are merely for clarifying the technical contents of the present invention, and should not be for limiting the present invention only to those embodiments, but numerous modifications can be made without departing from the true spirit of the invention and scope of the Claims.

INDUSTRIAL APPLICABILITY

The objective lens according to the present invention can suppress deterioration of focal spots, caused by a drop in diffraction efficiency, and can also solve a new problem that the blue-violet laser beam, reflected on the inner face of the emission surface of the objective lens, is focused inside the objective lens, damaging the lens. The objective lens according to the present invention can improve the yield and decrease the manufacturing cost since the margins in the molding of the objective lens can be expanded.

Therefore the objective lens according to the present invention is useful as an objective lens used for the optical head and optical disk device for recording or reproducing information on or from such an information recording medium as an optical disk, and the information processing device including this optical disk device, such as a computer, optical disk player, optical disk recorder and game device, can record or reproduce information on or from the BD or the DVD well, and can be applied to a wide range of application fields.

The invention claimed is:

1. An objective lens made from synthetic resin, that converges a laser beam emitted from a laser light source onto an information recording surface of an information recording medium, the objective lens comprising:
   a lens having a first surface facing the laser light source and a second surface facing the information recording medium; and
   an anti-reflection coat formed on the second surface, wherein
   the lens converges a first laser beam having a first wavelength $\lambda 1$ (390 nm$\leq \lambda 1 \leq$430 nm) that transmits through an area, of which radius from an optical axis of the objective lens is R1, of the first surface, onto an information recording surface of a first information recording medium, and converges a second laser beam having a second wavelength $\lambda 2$ (630 nm$\leq \lambda 2 \leq$680 nm) that transmits through an area, of which radius from the optical axis of the objective lens is R2 (R2<R1), of the first surface, onto an information recording surface of a second information recording medium that is different from the first information recording medium,
   a transmittance T1_0 [%] of the anti-reflection coat when an incident angle of the first laser beam is 0° and a transmittance T1_40 [%] of the anti-reflection coat when the incident angle of the first laser beam is 40° satisfy 0.95≤T1_0/T1_40≤1.05,
   in the area of which radius is R2, a transmittance of the first laser beam satisfies the transmittance ≥92%,
   a transmittance T2_0 [%] of the anti-reflection coat when an incident angle of the second laser beam is 0° satisfies 85%≤T2_0<96%, and
   a transmittance T2_40 [%] of the anti-reflection coat when the incident angle of the second laser beam is 40° satisfies T2_40≥94%, and
   the transmittance T2_0 and the transmittance T2_40 satisfy 0.85≤T2_0/T2_40≤0.97.

2. The objective lens according to claim 1, wherein the transmittance T1_0 [%] of the anti-reflection coat and a transmittance T1_60 [%] of the anti-reflection coat when the incident angle of the first laser beam is 60° satisfy 0.90≤T1_60/T1_0≤0.95.

3. The objective lens according to claim 1, wherein the transmittance T2_0 in a range of the second wavelength $\lambda 2 \pm 20$ nm is within a range of the transmittance T2_0±4%.

4. The objective lens according to claim 1, wherein
   a diffraction structure is formed on the first surface, wherein
   the area from the radius R2 to the radius R1 converges the first laser beam onto the information recording surface of the first information recording medium, and generates an aberration in the second laser beam so that the second laser beam transmitted through the area from the radius R2 to the radius R1 is not converged onto the information recording surface of the second information recording medium.

5. The objective lens according to claim 1, wherein
the lens converges a third laser beam having a third wavelength λ3 (760 nm≤λ3≤800 nm) that transmits through an area, of which radius from the optical axis of the objective lens is R3 (R3<R2), of the first surface, onto an information recording surface of a third information recording medium which is different from the first information recording medium and the second information recording medium.

6. The objective lens according to claim 5, wherein the transmittance T3$a$ [%] of the third laser beam in the vicinity of the optical axis of the objective lens and the transmittance T3$r$ [%] of the third laser beam in the vicinity of the radius R3 of the objective lens satisfy 0.95 T3$a$/T3$r$≤1.05.

7. The objective lens according to claim 5, wherein the transmittance T3$a$ [%] of the third laser beam in the vicinity of the optical axis of the objective lens and the transmittance T3$r$ [%] of the third laser beam in the vicinity of the radius R3 of the objective lens satisfy 0.85 T3$a$/T3$r$≤0.95.

8. The objective lens according to claim 5, wherein
a diffraction structure is formed on the first surface, wherein
the area from the radius R3 to the radius R2 converges the first laser beam onto the information recording surface of the first information recording medium, converges the second laser beam onto the information recording surface of the second information recording medium, and generates an aberration in the third laser so that the third laser beam transmitted through the area from the radius R3 to the radius R2 is not converged onto the information recording surface of the third information recording medium, and
the area from the radius R2 to the radius R1 converges the first laser beam onto the information recording surface of the first information recording medium, generates an aberration in the second laser beam so that the second laser beam transmitted through the area from the radius R2 to the radius R1 is not converged onto the information recording surface of the second information recording medium, and generates an aberration in the third laser beam so that the third laser beam transmitted through the area from the radius R2 to the radius R1 is not converged onto the information recording surface of the third information recording medium.

9. The objective lens according to claim 1, wherein
the anti-reflection coat is configured to have at least two layers and at most 30 layers, and
each layer of the anti-reflection coat is made from at least two types of materials, out of low refractive index materials of which refractive index n at wavelength 500 nm is at least 1.3 and at most 1.55, and high refractive index materials of which refractive index n at wavelength 500 nm is at least 1.7 and at most 2.5.

10. The objective lens according to claim 9, wherein
the low refractive index material is a material of which main component is $SiO_2$ or $MgF_2$, and
the high refractive index material is a material of which main component is $Ta_2O_5$, $TiO_2$, $CeO_2$, $ZrO_2$, $HfO_2$ or $CeF_3$.

11. An optical head, comprising:
a first laser light source that emits a first laser beam having a first wavelength λ1 (390 nm≤λ1≤430 nm);
a second laser light source that emits a second laser beam having a second wavelength λ2 (630 nm≤λ2≤680 nm);
the objective lens according to claim 1 that converges the first laser beam emitted from the first laser light source onto an information recording surface of a first information recording medium, and converges the second laser beam emitted from the second laser light source onto an information recording surface of a second information recording medium; and
a light receiving unit that receives the first laser beam or the second laser beam reflected by the first information recording medium or the second information recording medium.

12. An optical disk device, comprising:
the optical head according to claim 11;
a motor which rotates a first information recording medium and a second information recording medium; and
a control unit which controls the optical head and the motor.

13. An information processing device, comprising:
the optical disk device according to claim 12; and
an information processing unit which processes information to be recorded on the optical disk device and/or information reproduced from the optical disk device.

* * * * *